US008873079B2

(12) United States Patent
Iwahashi

(10) Patent No.: US 8,873,079 B2
(45) Date of Patent: Oct. 28, 2014

(54) IMAGE READER DEVICE AND IMAGE FORMATION APPARATUS THAT UTILIZES READ PARAMETERS AND IMAGE PROCESSING PARAMETERS

(71) Applicant: Oki Data Corporation, Tokyo (JP)

(72) Inventor: Keisuke Iwahashi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/048,072

(22) Filed: Oct. 8, 2013

(65) Prior Publication Data

US 2014/0104633 A1 Apr. 17, 2014

(30) Foreign Application Priority Data

Oct. 15, 2012 (JP) .................................. 2012-227910
Jun. 21, 2013 (JP) .................................. 2013-130682

(51) Int. Cl.
*G06F 3/12* (2006.01)
*H04N 1/00* (2006.01)
*G06T 1/00* (2006.01)

(52) U.S. Cl.
CPC ................ *H04N 1/0097* (2013.01); *G06T 1/00* (2013.01); *H04N 1/00798* (2013.01)
USPC ....................................................... 358/1.13

(58) Field of Classification Search
None
See application file for complete search history.

(56) References Cited

U.S. PATENT DOCUMENTS

| 2002/0071131 A1* | 6/2002 | Nishida ........................ 358/1.9 |
| 2002/0075503 A1* | 6/2002 | Ohira et al. .................. 358/1.15 |
| 2003/0002076 A1* | 1/2003 | Takayama et al. ........... 358/1.15 |
| 2011/0090351 A1* | 4/2011 | Cote et al. .................. 348/208.1 |

FOREIGN PATENT DOCUMENTS

| JP | 2008-011080 | * | 1/2008 |
| JP | 2008-011080 A | | 1/2008 |

* cited by examiner

*Primary Examiner* — Jeremiah Bryar
(74) *Attorney, Agent, or Firm* — Marvin A. Motsenbocker; Mots Law. PLLC

(57) ABSTRACT

An image reader device reads images from pages of a document based on a read parameter for a current page, and outputs first image data. The first image data is processed based on an image processing parameter for the current page, to output second image data. A storage unit stores the second image data, the read parameter for a subsequent page, and the image processing parameter for the subsequent page. The stored read parameter for the subsequent page is provided directly to an image reading unit upon completion of the image read processing of the current page. The stored image processing parameter for the subsequent page is provided directly to an image processing unit upon completion of the image processing of the current page.

12 Claims, 20 Drawing Sheets

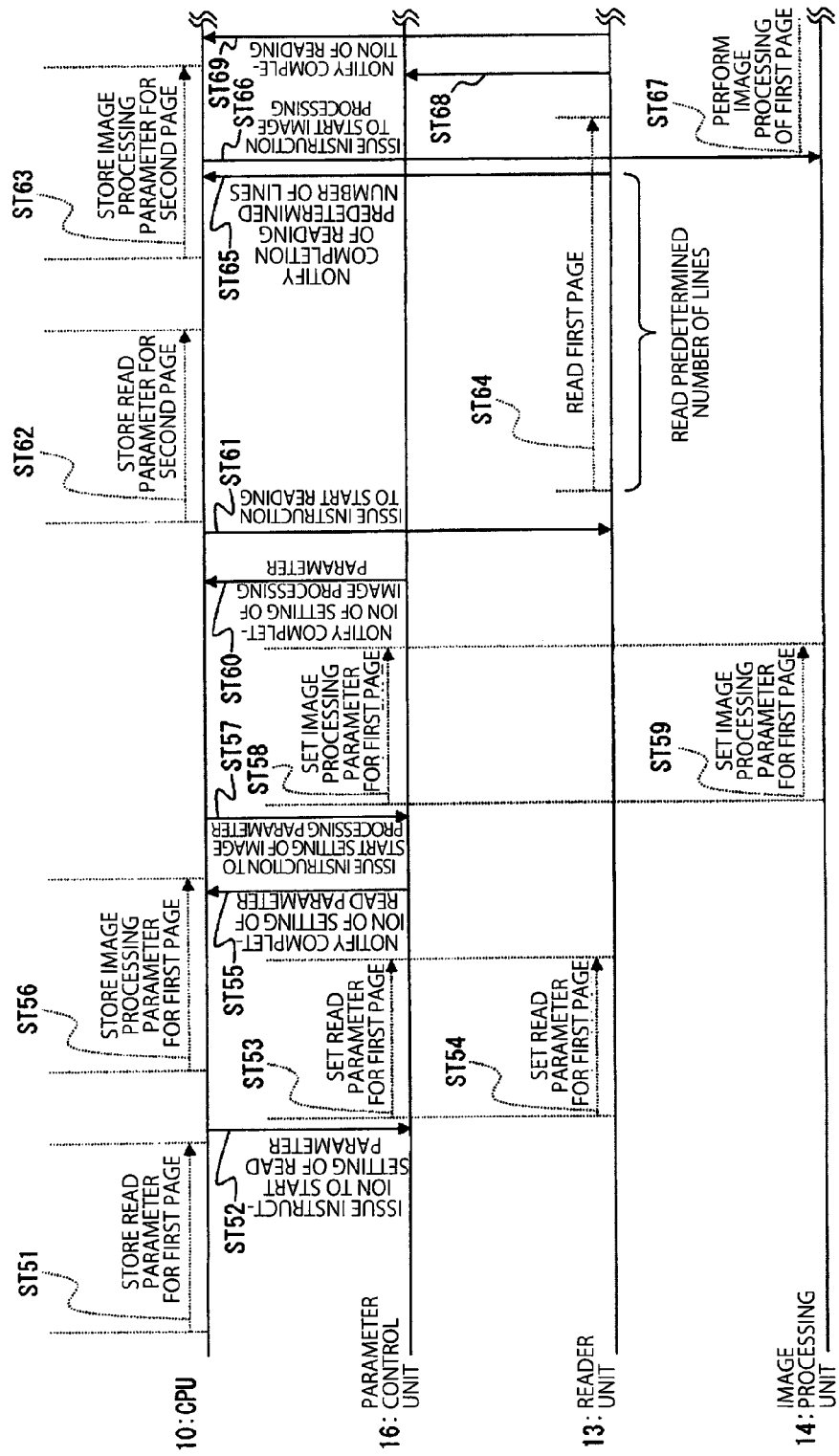

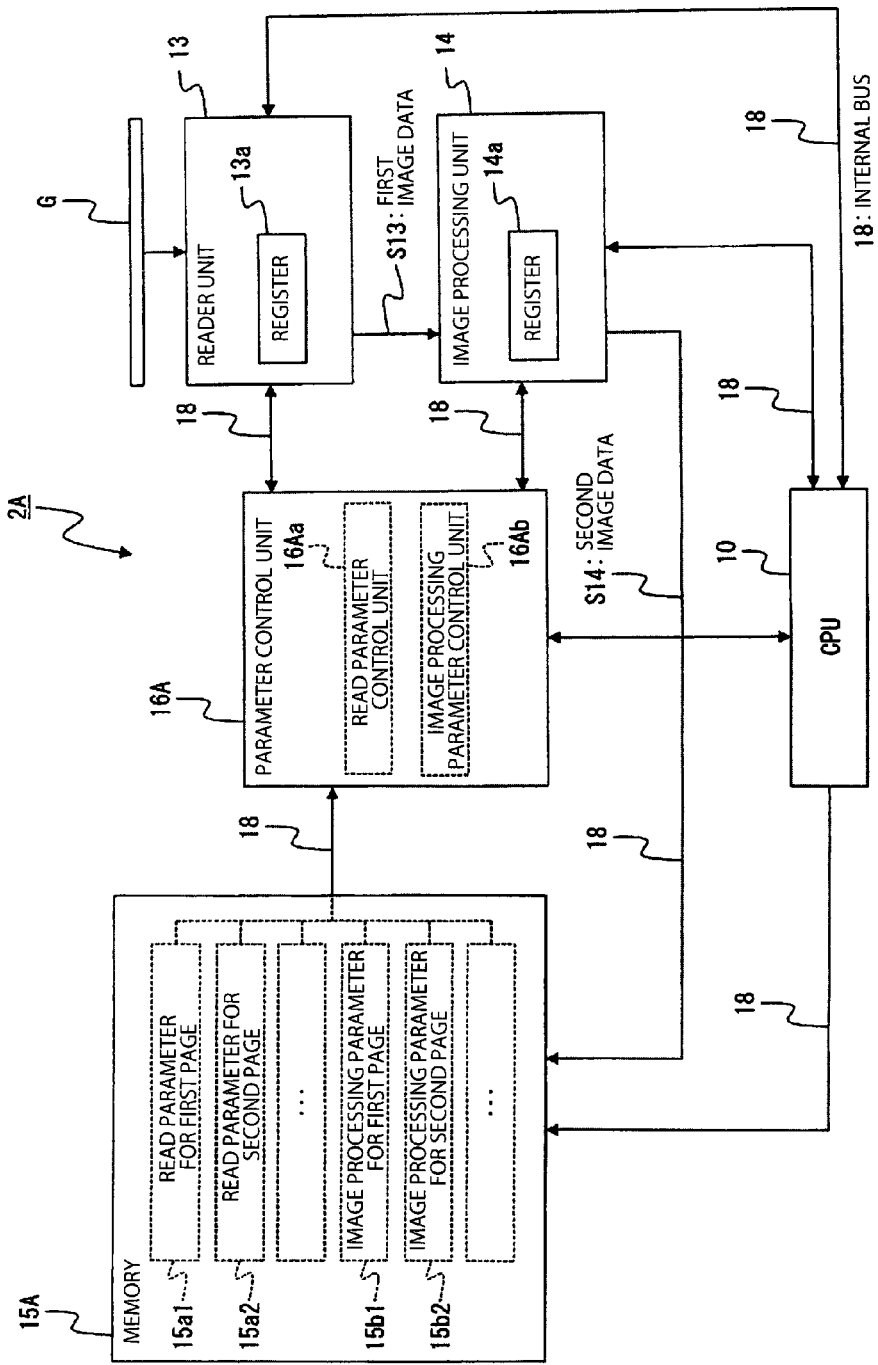

SETTING PARAMETER SELECTION IN FIG. 12

FIG.18

PROCESSING PARAMETER SETTING PATTERNS IN FIG. 17

| FLAG | flag0 | flag1 | flag2 | flag3 |  | SELECTED PATTERN |
|---|---|---|---|---|---|---|
|  | ○ | ○ | × | × | → | A |
|  | ○ | ○ | ○ | × | → | B |
|  | ○ | ○ | × | ○ | → | C |
|  | ○ | ○ | ○ | × | → | D |

READ PARAMETER SETTING PROCESSING IN FIG. 16

IMAGE READER DEVICE AND IMAGE FORMATION APPARATUS THAT UTILIZES READ PARAMETERS AND IMAGE PROCESSING PARAMETERS

CROSS REFERENCE TO RELATED APPLICATIONS

This application claims priority based on 35 USC 119 from prior Japanese Patent Applications No. 2012-227910 filed on Oct. 15, 2012 and No. 2013-130682 filed on Jun. 21, 2013, entitled "IMAGE READER DEVICE AND IMAGE FORMATION APPARATUS", the entire contents of which are incorporated herein by reference.

BACKGROUND OF THE INVENTION

Field of the Invention

This disclosure relates to an image reader device configured to read an image of a document as image data, and to an image formation apparatus incorporating an image reader device and being configured to form an image on a record medium such as paper on the basis of image data read by the image reader device.

A conventional operation of consecutively reading pages of a document by using an image reader device provided with an auto document feeder (hereinafter referred to as "ADF") function is conducted as follows. After a first page of the document is read, the image reader device sets and stores an image processing parameter for a second page of the document in a setting register and then starts reading the second page of the document. This operational flow poses a problem in that it takes a long time to switch from the completion of reading the first page of the document to the start of reading the second page of the document.

As a method of solving this problem, Patent Document 1 (Japanese Patent Application Publication No. 2008-11080) describes a method of reducing the time needed to switch from a first page of a document to a second page of the document by: providing multiple setting registers; and storing an image processing parameter for the second page of the document in an idle setting register during the image processing of the first page of the document.

SUMMARY OF THE INVENTION

However, the image reader device described in Patent Document 1 includes the multiple setting registers that presents problems such as an increase in the scale of a logic circuit, and a reduction in the applicability of a logic circuit and firmware which perform the image processing of each page.

A first aspect of the invention is an image reader device that includes: an image reading unit configured to read images from pages of a document by image read processing based on a read parameter for a current page, and to output first image data; an image processing unit configured to process the first image data outputted from the image reading unit by image processing based on an image processing parameter for the current page, and to output second image data; a storage unit configured to store the second image data outputted from the image processing unit, the read parameter for a subsequent page, and the image processing parameter for the subsequent page; and a parameter control unit configured to read the read parameter for the subsequent page stored in the storage unit and provide the read parameter for the subsequent page directly to the image reading unit upon completion of the image read processing of the current page, and to read the image processing parameter for the subsequent page stored in the storage unit and provide the image processing parameter for the subsequent page directly to the image processing unit upon completion of the image processing of the current page.

A second aspect of the invention is an image formation apparatus that includes: the image reader device of the first aspect; and an image formation unit configured to form an image on a record medium based on the second image data, which is read and subjected to the image read processing and the image processing by the image reader device.

According to the above aspect(s), it is possible to suppress an increase in the scale of a logic circuit of the image reader device and to enhance the applicability of a logic circuit and firmware which perform image processing of each page of a document.

BRIEF DESCRIPTION OF THE DRAWINGS

FIG. 8A is a sequence diagram for explaining transitions in image read processing among CPU 10, parameter control unit 16, reader unit 13, and image processing unit 14 in FIG. 1.

FIG. 9 is a block diagram illustrating a schematic configuration of image reader device 2A according to a second embodiment of the invention.

FIG. 18 is a table illustrating examples of the processing parameter setting patterns in FIG. 17.

DETAILED DESCRIPTION OF EMBODIMENTS

Figure 1:
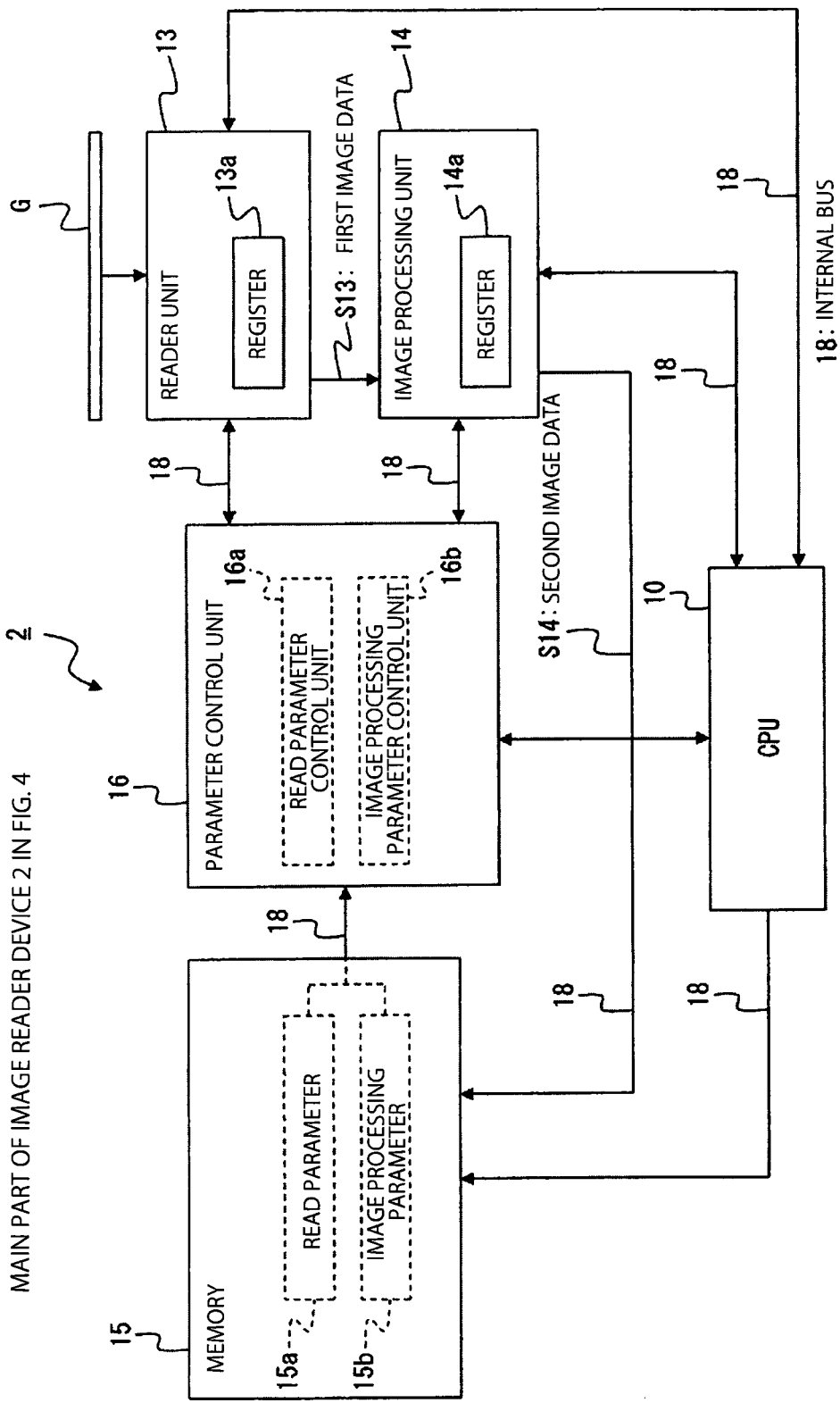
FIG. 1 is a block diagram illustrating a schematic configuration of a main part of image reader device 2 in FIG. 4.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Modes of carrying out the invention become clear by reading the following descriptions of preferred embodiments with reference to the accompanying drawings. It is to be noted, however, that the drawings are solely provided for the purpose of explanations and are not intended to limit the scope of the invention.

First Embodiment

Configuration of First Embodiment

Figure 2:
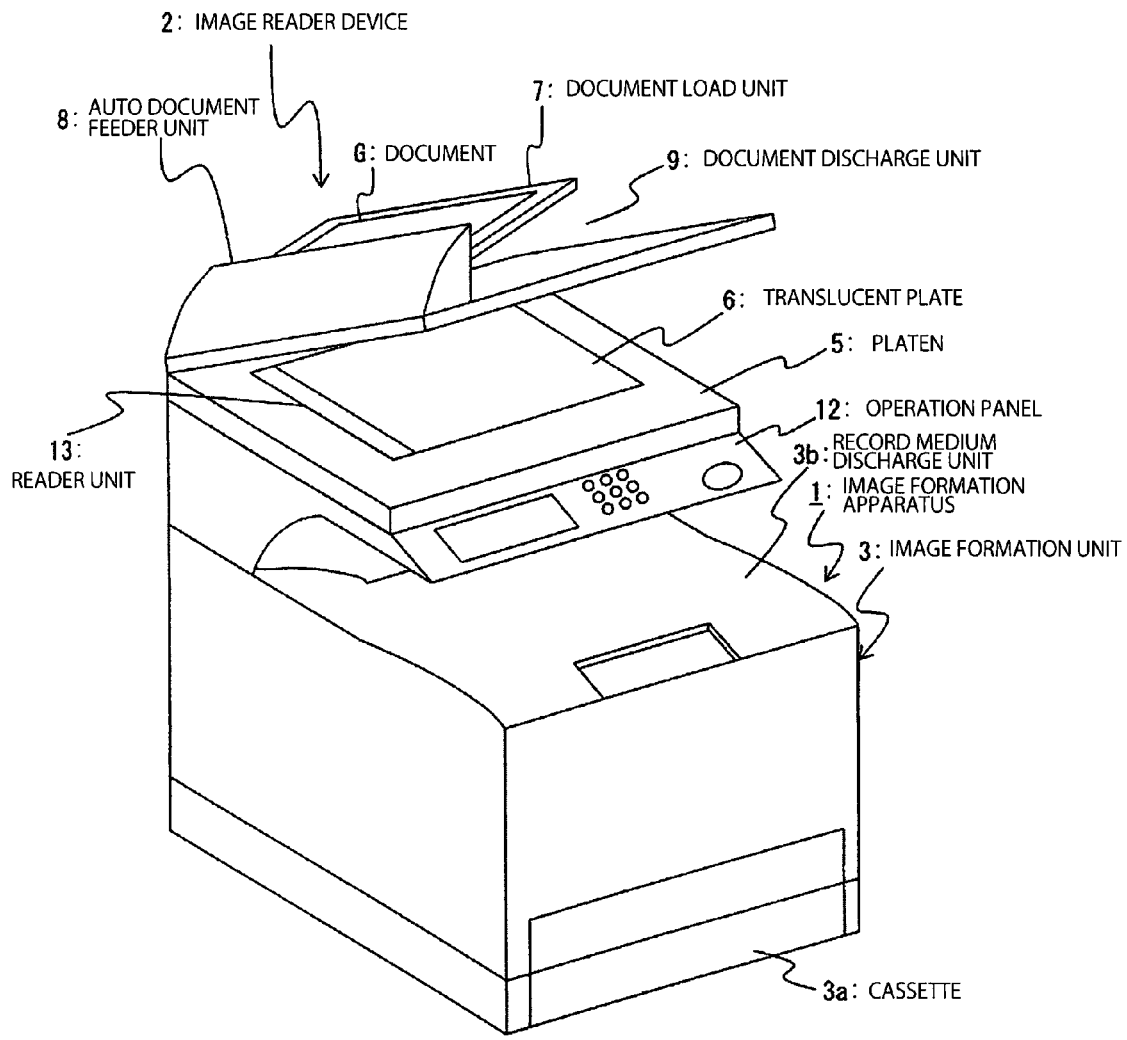
FIG. 2 is an external view schematically illustrating image formation apparatus 1 according to a first embodiment of the invention.

FIG. 2 is an external view schematically illustrating image formation apparatus 1 according to a first embodiment of the invention. Image formation apparatus 1 includes image reader device 2 mounted on image formation unit 3. Image reader device 2 may be a scanner, for example, which is configured: to output first image data by optically reading document G, which is prepared by forming an image on a document medium such as paper, on the basis of read parameter 15; and to output second image data by performing image processing of the first image data on the basis of image processing parameter 15b. Image formation unit 3 may be a printer, for example, which is configured to form the second image data generated by image reader device 2 into an image on a record medium such as a paper sheet.

Image reader device 2 includes platen 5 on which document G is placed. Translucent plate 6 made of translucent glass or the like is fitted in platen 5. Reader unit 13 is provided inside platen 5. Reader unit 13 is an image reading unit configured to illuminate document G with light and to read the image thereon. Further, operation panel 12 as an operation display unit is disposed on a front side of platen 5.

An ADF unit is openably and closably provided on an upper part of platen 5. The ADF unit includes document load unit 7 on which to load the pages of document G, auto document feeder unit 8, and document discharge unit 9, for example. Auto document feeder unit 8 is configured to feed the pages of document G, loaded on document load unit 7, one by one to a document read section and to discharge the pages of document G to document discharge unit 9 in the state where platen 5 and document discharge unit 9 are closed.

Cassette 3a containing record media such as paper sheets is detachably attached to a lower part of image formation unit 3. A record medium contained in cassette 3a is conveyed by a not-illustrated sheet feeder mechanism. Then, an image is formed on the record medium on the basis of the second image data outputted from image reader device 2. After this, the record medium is discharged to record medium discharge unit 3b provided at a recess between image reader device 2 and image formation unit 3.

Figure 3:
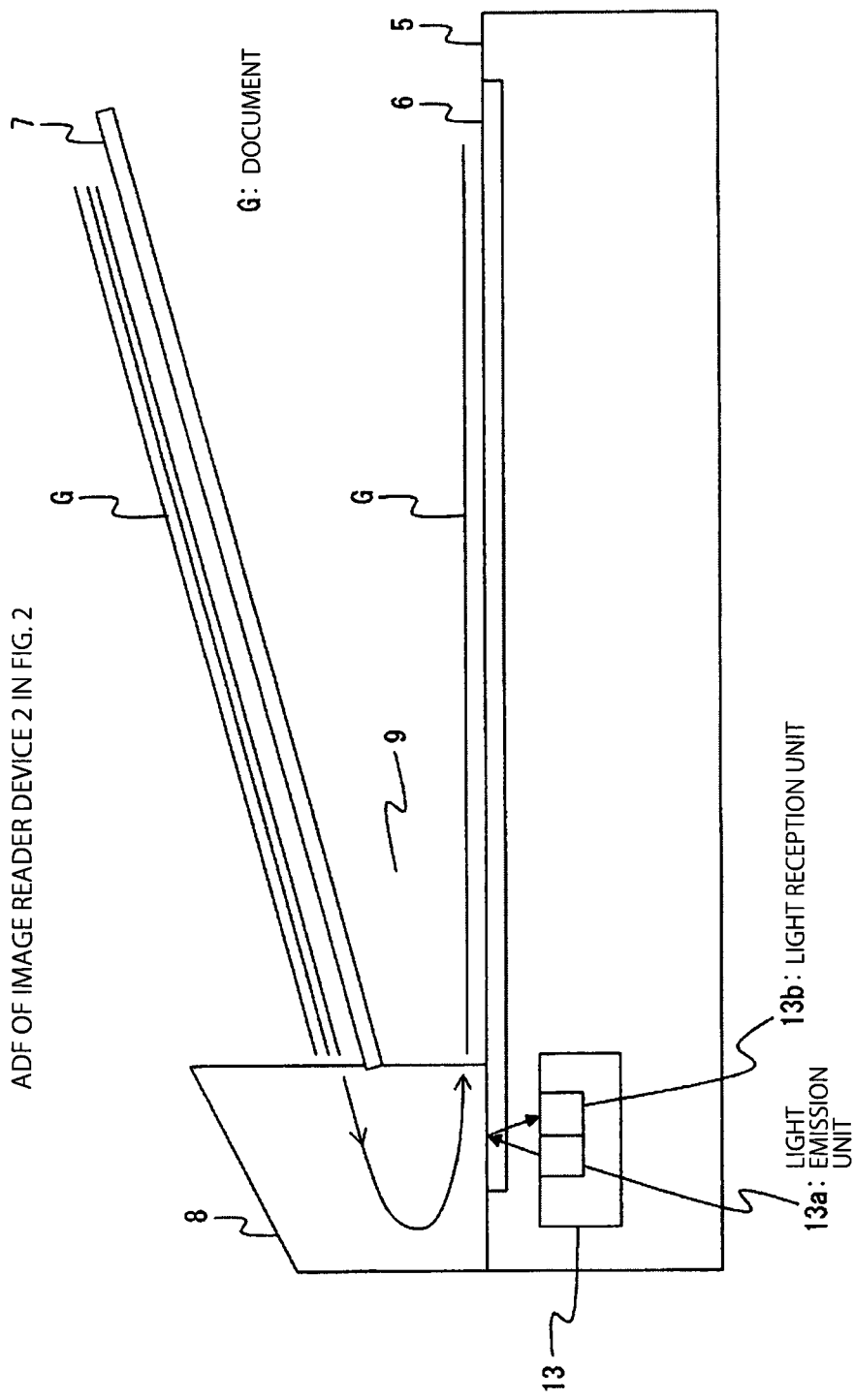
FIG. 3 is a view for explaining an ADF in image reader device 2 of FIG. 2.

FIG. 3 is a view for explaining the ADF in image reader device 2 of FIG. 2. In FIG. 3, document G loaded in document load unit 7 passes through a route indicated with an arrow by way of auto document feeder unit 8, then passes above reader unit 13, and is discharged to document discharge unit 9. Reader unit 13 is configured to illuminate a portion of document G, passing immediately above reader unit 13, with light from light emission unit 13a, to receive reflected light with light reception unit 13b, and to obtain the first image data using a not-illustrated photoelectric conversion element located inside.

When reader unit 13 reads the image on document G and obtains the first image data, the quality of the first image data is affected by the brightness around image reader device 2, by the color of the medium used for document G, and by other factors. This is why a user sets a read parameter to read mechanism 13 by use of operation panel 12.

Figure 4:
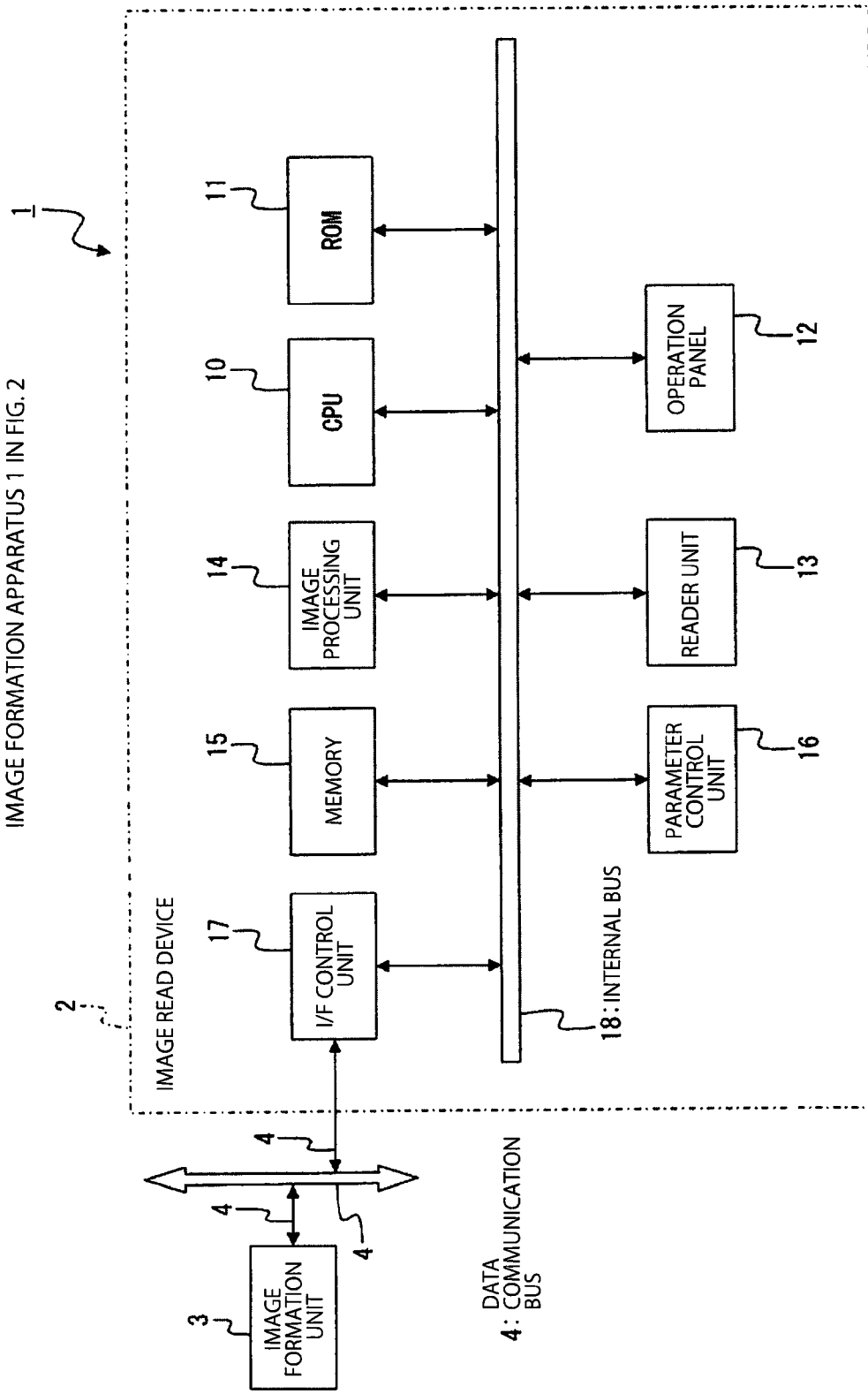
FIG. 4 is a block diagram illustrating a schematic circuit configuration of image formation apparatus 1 of FIG. 2.

FIG. 4 is a block diagram illustrating a schematic circuit configuration of image formation apparatus 1 of FIG. 2. Image reader device 2 constituting image formation apparatus 1 is connected to image formation unit 3 via data communication bus 4. Data communication bus 4 is formed from a Universal Serial Bus (hereinafter referred to as "USB") interface, for example. Data communication bus 4 is a communication channel for transmitting and receiving commands outputted from central processing unit (hereinafter referred to as "CPU") 10 and second image data S14 outputted from image processing unit 14.

In image reader device 2, CPU 10, read only memory (hereinafter referred to as "ROM") 11 which stores control programs for CPU 10, operation panel 12 as the operation display unit, reader unit 13, image processing unit 14, memory 15, parameter control unit 16, and interface (hereinafter referred to as "I/F") control unit 17 are connected to one another via internal bus 18. CPU 10 is configured to control the entire image reader device 2 on the basis of the control programs stored in ROM 11.

Reader unit 13 is configured to read an image from document G and to output first image data S13. Image processing unit 14 is configured to subject first image data S13, which is outputted from read mechanism 13, to image processing, such as shading correction processing, compression processing or gamma correction, based on an image processing parameter, and thus to output second image data S14.

Here, the shading correction processing is processing to correct luminance unevenness attributed to characteristics of an optical system and an image shooting system so as to obtain an image with uniform brightness. The compression processing is a form of processing performed to reduce the volume of data in accordance with prescribed procedures while retaining the significance of the data. Further, the gamma correction is a correction applied to adjust the intensities of the red (R), green (G), and blue (B) colors acquired from the reading of an image in such a manner as not to change brightness proportions among RGB, which would otherwise be changed when the original intensities of RGB are put into printing.

Memory 15 is a storage unit used for a temporary accumulation of first image data S13 and second image data S14, and for a temporary storage of read parameter 15a and image processing parameter 15b. Parameter control unit 16 is configured to perform a setting control of read parameter 15a used for image read processing by reader unit 13, and of image processing parameter 15b used for the image processing by image processing unit 14. I/F control unit 17 is configured to control data transmission and reception to and from data communication bus 4.

FIG. 1 is a block diagram illustrating a schematic configuration of a main part of image reader device 2 in FIG. 4. CPU 10 has a function by which read parameter 15a used to control reader unit 13 and image processing parameter 15b used by image processing unit 14 are temporarily stored in memory 15.

Read parameter control unit 16a in parameter control unit 16 is configured to control the delivery of read parameter 15a stored in memory 15 to reader unit 13 on the basis of a read parameter setting command from CPU 10 and an operating state of reader unit 13. Reader unit 13 is provided with register 13a as a first data retainer, and is configured to read the image from document G on the basis of read parameter 15a set to register 13a and thus to output first image data S13.

Image processing parameter control unit 16b in parameter control unit 16 is configured to control the delivery of image processing parameter 15b stored in memory 15 to image processing unit 14 on the basis of an image processing parameter setting command from CPU 10 and an operating state of image processing unit 14. Image processing unit 14 is provided with register 14a as a second data retainer, and is configured to perform the image processing of first image data S13 on the basis of image processing parameter 15b set to register 14a and thus to output second image data S14.

In addition, each of reader unit 13 and image processing unit 14 has a function to notify CPU 10 and parameter control unit 16 of its operating state.

Operations of First Embodiment

The processing of reading the image from document G and outputting second image data S14 by image reader device 2 of FIG. 1 is executed through a so-called pipeline processing. Specifically, CPU 10 instructs parameter control unit 16, reader unit 13, and image processing unit 14 to repeatedly and concurrently execute two or more series of processing elements. Each series of processing elements is executed consecutively by the instructed units.

First, processing by parameter control unit 16, reader unit 13, and image processing unit 14 is described. Then, transitions in the entire processing by image reader device 2 are described.

Figure 5:
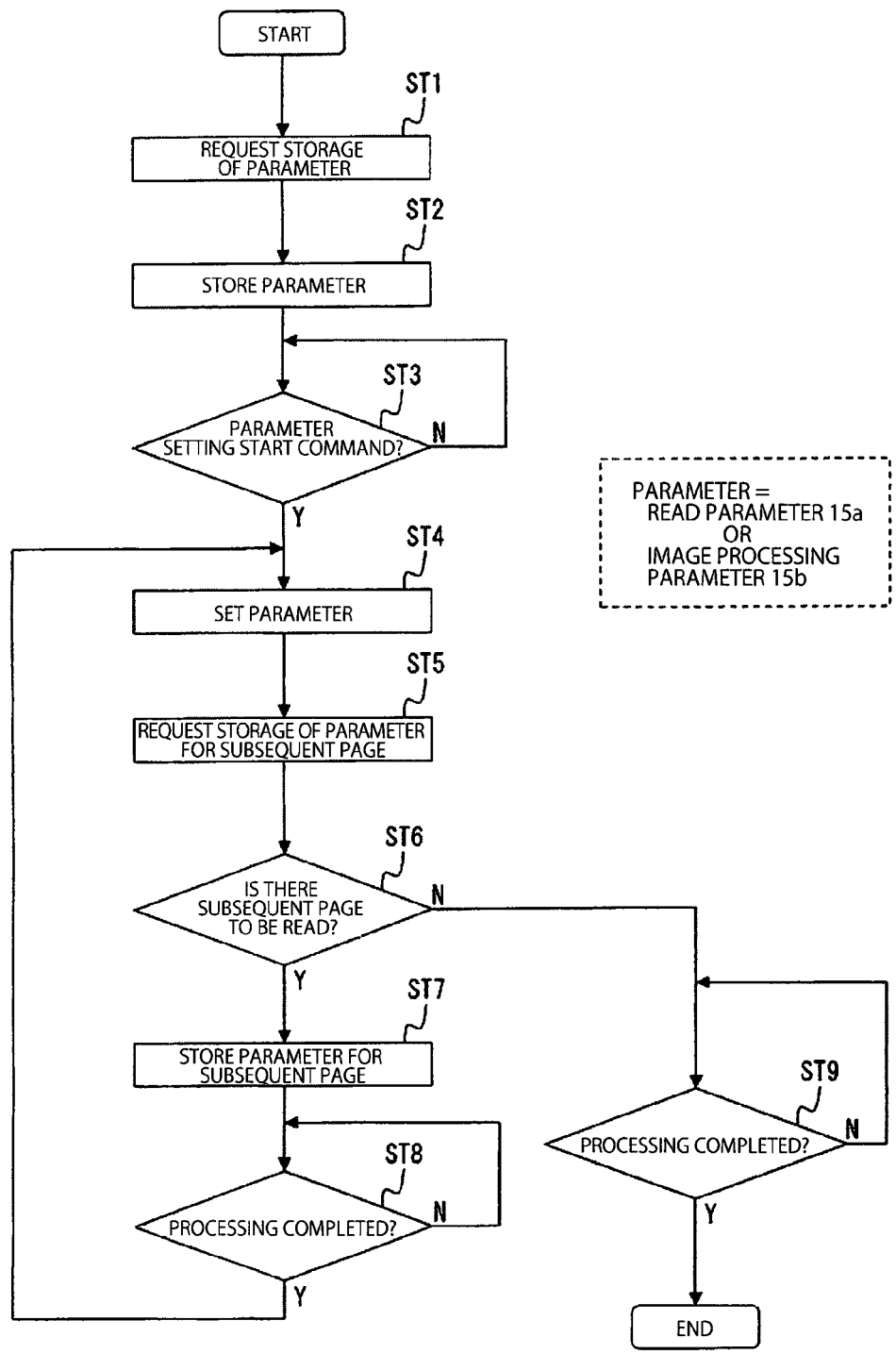
FIG. 5 is a flowchart illustrating the parameter setting processing by parameter control unit 16 in FIG. 1.

FIG. 5 is a flowchart illustrating the parameter setting processing by parameter control unit 16 in FIG. 1.

First, read parameter setting processing by parameter control unit 16 of the first embodiment is described in accordance with FIG. 5 and with reference to FIG. 1. For explanatory convenience, only operations relevant to the first embodiment are described therein. The term "parameter" on the flowchart in FIG. 5 represents either read parameter 15a or image processing parameter 15b.

When the user issues a command to start reading document G by manipulation of operation panel 12, processing by parameter control unit 16 is started and the processing proceeds to step ST1. In step ST1, read parameter control unit 16a in parameter control unit 16 requests CPU 10 to store read parameter 15a for a first page of document G in memory 15. Then, the processing proceeds to step ST2.

In step ST2, CPU 10 stores read parameter 15a in memory 15. Then, the processing proceeds to step ST3. In step ST3, CPU 10 commands read parameter control unit 16a to start setting read parameter 15a to reader unit 13 (Y). Then, the processing proceeds to step ST4.

In step ST4, read parameter control unit 16a sets read parameter 15a stored in memory 15 to reader unit 13. Then, the processing proceeds to step ST5. In step ST5, after the setting is completed, read parameter control unit 16a notifies CPU 10 of the completion of setting the parameter and requests CPU 10 to store read parameter 15a for a subsequent page in memory 15. Then, the processing proceeds to step ST6.

In step ST6, a judgment is made as to whether or not there is a subsequent page to be read. When there is the subsequent page to be read (Y), the processing proceeds to step ST7. In step ST7, CPU 10 stores read parameter 15a for the subsequent page in memory 15, and notifies read parameter control unit 16a of the completion of storing read parameter 15a for a subsequent page. Then, the processing proceeds to step ST8. In step ST8, read parameter control unit 16a waits for the completion of outputting first image data S13 from reader unit 13 (N). Upon completion of outputting first image data S13 (Y), read parameter control unit 16a sets read parameter 15a for the subsequent page to register 13a of reader unit 13. Thereafter, the processing from steps ST4 through ST8 is repeated until there are no more pages to be read subsequently (N) in step ST6. The processing proceeds to step ST9 when there are no more pages to be read subsequently (N) in step ST6.

In step ST9, CPU 10 waits for the completion of outputting first image data S13 from reader unit 13 (N). Upon completion of outputting first image data S13 (Y), CPU 10 terminates the processing by read parameter control unit 16a.

Next, image processing parameter setting processing by parameter control unit 16 of the first embodiment is described.

When the user issues a command to start reading document G by manipulation of operation panel 12, processing by parameter control unit 16 is started and the processing proceeds to step ST1. In step ST1, image processing parameter control unit 16b in parameter control unit 16 requests CPU 10 to store image processing parameter 15b for a first page of document G in memory 15. Then, the processing proceeds to step ST2.

In step ST2, CPU 10 stores image processing parameter 15b in memory 15. Then, the processing proceeds to step ST3. In step ST3, CPU 10 commands image processing parameter control unit 16b to start setting image processing parameter 15b to image processing unit 14 (Y). Then, the processing proceeds to step ST4.

In step ST4, image processing parameter control unit 16b sets image processing parameter 15b stored in memory 15 to image processing unit 14. Then, the processing proceeds to step ST5. In step ST5, after the setting is completed, image processing parameter control unit 16b notifies CPU 10 of the completion of setting the parameter and requests CPU 10 to store image processing parameter 15b for a subsequent page in memory 15. Then, the processing proceeds to step ST6.

In step ST6, a judgment is made as to whether or not there is a subsequent page to be read. When there is the subsequent page to be read (Y), the processing proceeds to step ST7. In step ST7, CPU 10 stores image processing parameter 15b for the subsequent page in memory 15, and notifies image processing parameter control unit 16b of the completion of storing image processing parameter 15b for the subsequent page. Then, the processing proceeds to step ST8. In step ST8, image processing parameter control unit 16b waits for the completion of outputting second image data S14 from image processing unit 14 (N). Upon completion of outputting second image data S14 (Y), image processing parameter control unit 16b sets image processing parameter 15b for the subsequent page to register 14a of image processing unit 14. Thereafter, the processing from steps ST4 through ST8 is repeated until there are no more pages to be read subsequently (N) in step ST6. The processing proceeds to step ST9 when there are no more pages to be read subsequently (N) in step ST6.

In step ST9, CPU 10 waits for the completion of outputting second image data S14 from image processing unit 14 (N). Upon completion of outputting second image data S14 (Y), CPU 10 terminates the processing by image processing parameter control unit 16b.

Figure 6:
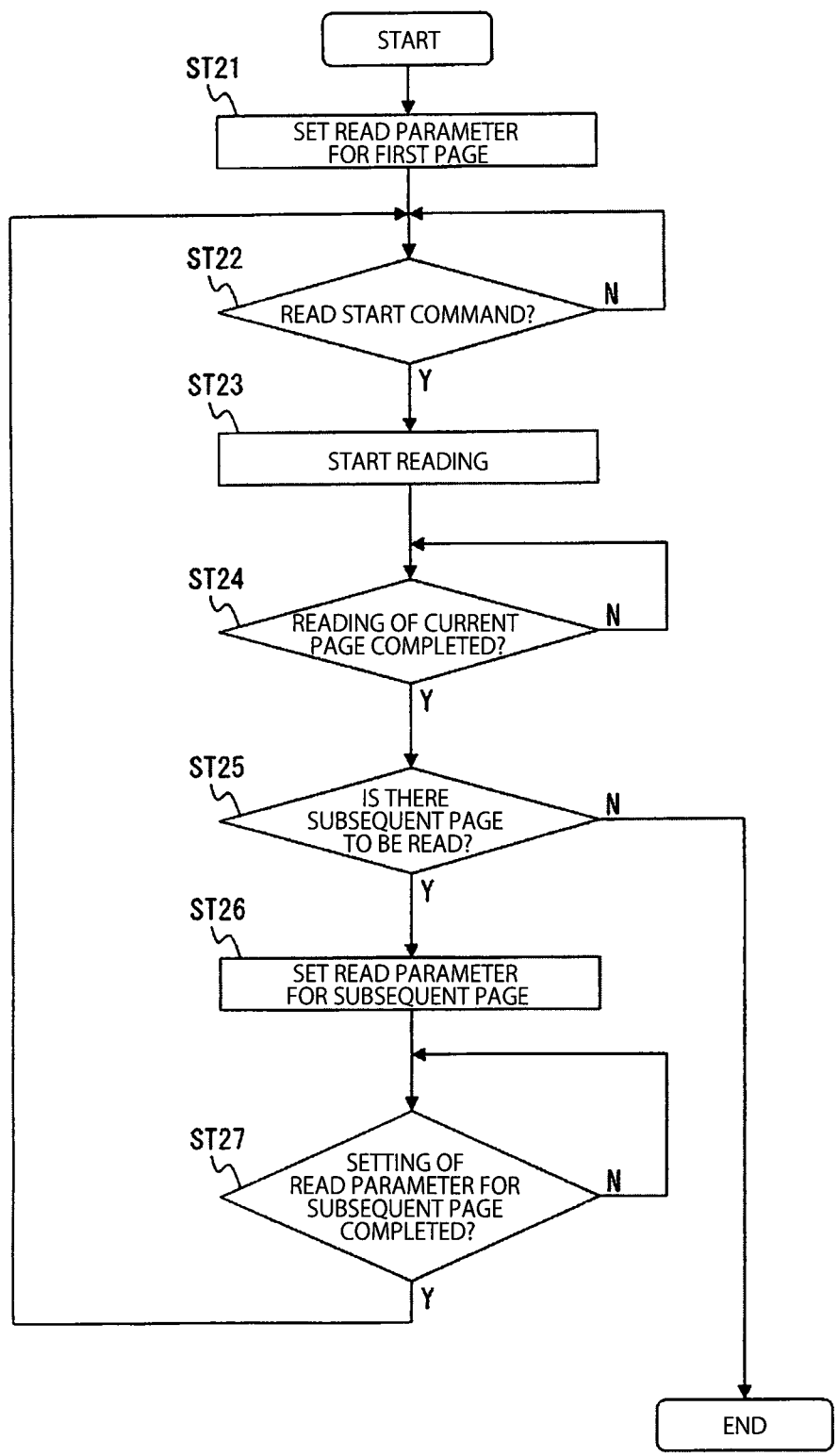
FIG. 6 is a flowchart illustrating a processing performed by reader unit 13 in FIG. 1.

FIG. 6 is a flowchart illustrating a processing performed by reader unit 13 in FIG. 1. The processing by reader unit 13 of the first embodiment is described in accordance with FIG. 6 and with reference to FIG. 1.

When the user issues a command to start reading document G by manipulation of operation panel 12, processing by reader unit 13 is started and the processing proceeds to step ST21. In step ST21, read parameter 15a for a first page of document G is set to register 13a of reader unit 13 in accordance with the read parameter control flow described on the basis of FIG. 5. Then, the processing proceeds to step ST22.

In step ST22, after setting read parameter 15a for the first page of document G, CPU 10 commands reader unit 13 to start reading (Y). Then, the processing proceeds to step ST23. In step ST23, reader unit 13 starts reading the first page of document G. Then, the processing proceeds to step ST24. In step ST24, reader unit 13 completes reading document G (Y). Then, the process proceeds to step ST25.

In step ST25, a judgment is made as to whether or not there is a subsequent page to be read. When there is a subsequent page to be read (Y), the processing proceeds to step ST26. In step ST26, read parameter 15a for the subsequent page is set to register 13a of reader unit 13 in accordance with the read parameter control flow described on the basis of FIG. 5. Then, the processing proceeds to step ST27. In step ST27, the setting of read parameter 15a is completed (Y). Then, the processing returns to step ST22.

In step ST22, CPU 10 commands reader unit 13 to start reading (Y). Then, the processing proceeds to step ST23. In step ST23, reader unit 13 starts reading an image from the subsequent page of document G. Thereafter, the processing from steps ST22 through ST27 is repeated until there are no more pages to be read subsequently (N) in step ST25. CPU 10 terminates the processing by reader unit 13 when there are no more pages to be read.

Figure 7:
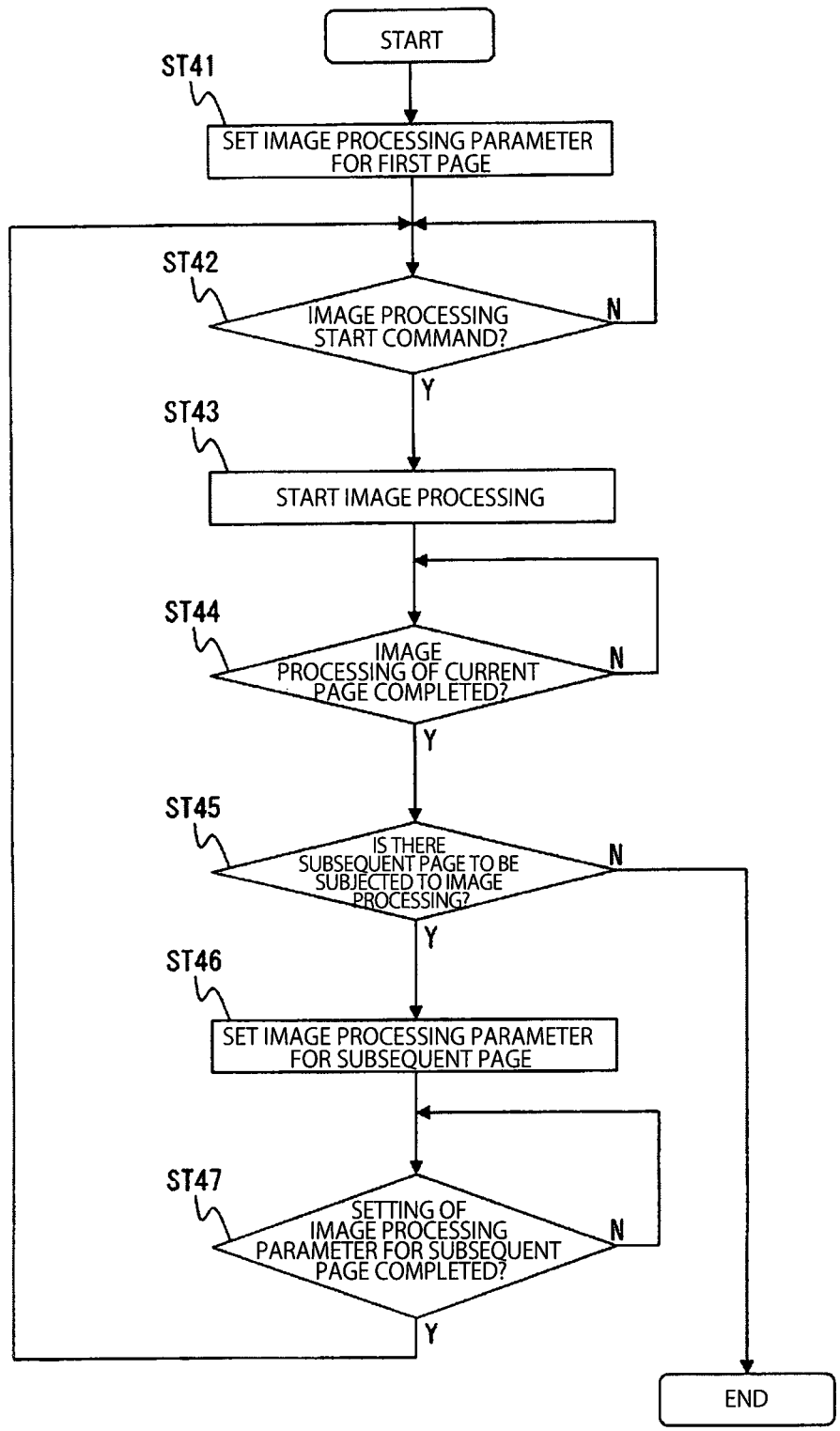
FIG. 7 is a flowchart illustrating a processing performed by image processing unit 14 in FIG. 1.

FIG. 7 is a flowchart illustrating a processing performed by image processing unit 14 in FIG. 1. The processing by image processing unit 14 in FIG. 1 is described in accordance with FIG. 7 and with reference to FIG. 1.

When the user issues a command to start reading document G by manipulation of operation panel 12, processing by image processing unit 14 is started and the processing proceeds to step ST41. In step ST41, image processing parameter 15b for a first page of document G is set to image processing unit 14 by image processing parameter control unit 16b. Then, the processing proceeds to step ST42. In step ST42, after image processing parameter control unit 16b sets image processing parameter 15b for the first page of document G, CPU 10 commands image processing unit 14 to start image processing (Y). Then, the processing proceeds to step ST43.

In step ST43, image processing unit 14 performs the image processing of first image data S13 of the first page of document G, which is outputted from reader unit 13, on the basis of image processing parameter 15b set to register 14a, thereby outputting second image data S14. Then, the processing proceeds to step ST44. In step ST44, image processing unit 14 completes the image processing (Y). Then, the processing proceeds to step ST45. In step ST45, a judgment is made as to whether or not there is a subsequent page to be subjected to the image processing. When there is the subsequent page (Y), the processing proceeds to step ST46. In step ST46, image processing parameter control unit 16b sets image processing parameter 15b for the subsequent page to image processing unit 14. Then, the processing proceeds to step ST47. In step ST47, the setting of image processing parameter 15b is completed (Y). Then, the processing returns to step ST42.

In step ST42, CPU 10 commands image processing unit 14 to start the image processing (Y). Then, the processing proceeds to step ST43. In step ST43, image processing unit 14 starts the image processing of the subsequent page. Thereafter, the processing from steps ST42 through ST47 is repeated until there are no more pages subsequently to be subjected to the image processing (N) in step ST45. CPU 10 terminates the processing by image processing unit 14 when there are no more pages to be subsequently subjected to the image processing (N) in step ST45.

Figure 8B:
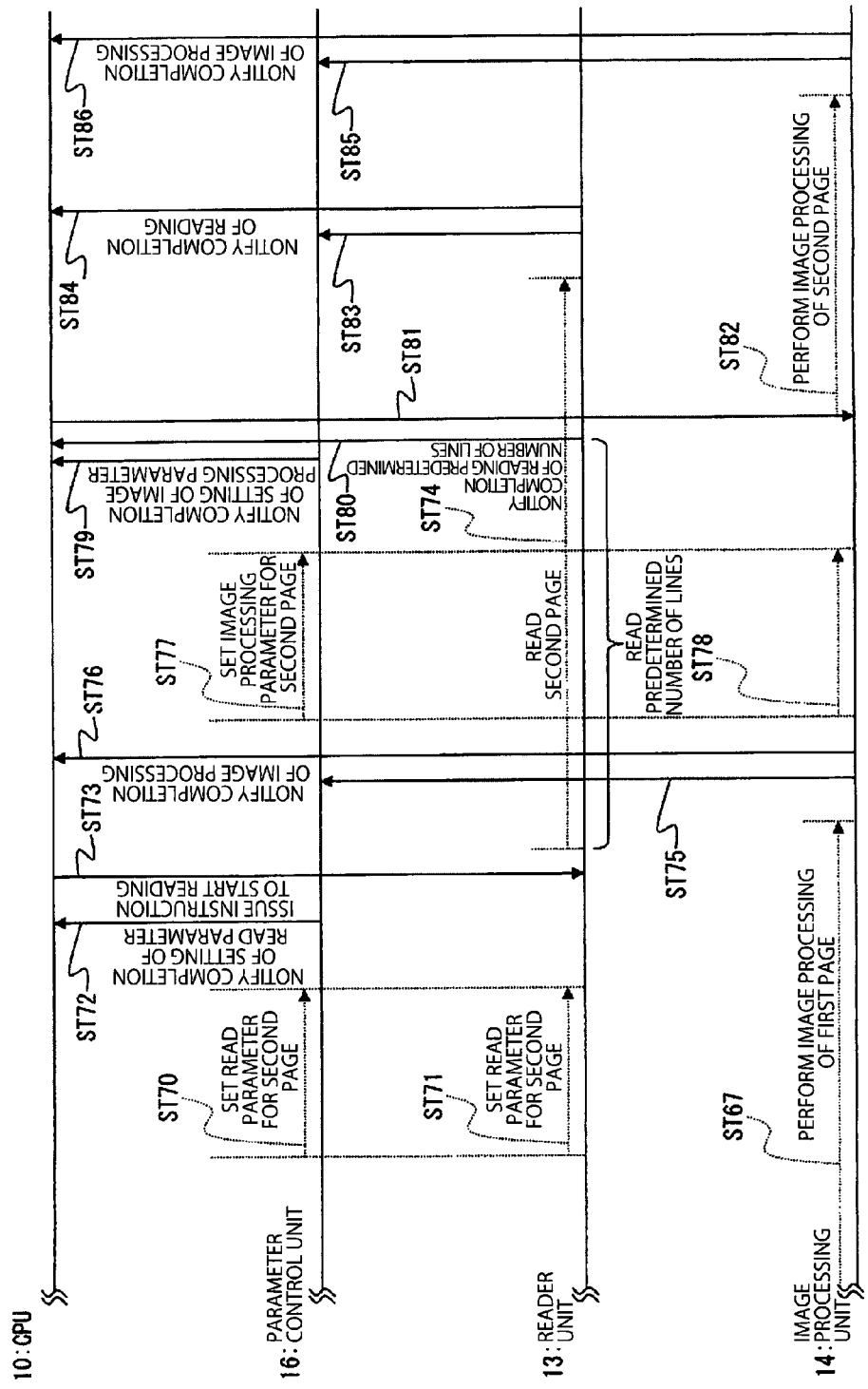
FIG. 8B is another sequence diagram for explaining transitions in the image read processing among CPU 10, parameter control unit 16, reader unit 13, and image processing unit 14 in FIG. 1.

FIGS. 8A and 8B are sequence diagrams for explaining transitions in the image read processing among CPU 10, parameter control unit 16, reader unit 13, and image processing unit 14 in FIG. 1.

The transitions in the processing by image reader device 2 are described in accordance with FIGS. 8A and 8B and with reference to FIGS. 1, and 5 to 7.

In step ST51 of FIG. 8A, CPU 10 stores read parameter 15a, which corresponds to the first page of document G, in memory 15 and then the processing proceeds to step ST52. In step ST52, CPU 10 instructs parameter control unit 16 to set read parameter 15a. Then, the processing proceeds to steps ST53 and ST54.

In step ST53, parameter control unit 16 sets read parameter 15a, which corresponds to the first page of document G, to reader unit 13. In step ST54, reader unit 13 stores read parameter 15a in register 13a. Then, the processing proceeds to step ST55. In step ST55, parameter control unit 16 notifies CPU 10 of the completion of setting read parameter 15a.

After CPU 10 instructs parameter control unit 16 to set read parameter 15a in step ST52, the processing proceeds to step ST56. In step ST56, image processing parameter 15b corresponding to the first page of document G is stored in memory 15. Then, the processing proceeds to step ST57.

In step ST57, CPU 10 instructs parameter control unit 16 to set image processing parameter 15b. Then, the processing proceeds to steps ST58 and ST59. In step ST58, parameter control unit 16 sets image processing parameter 15b, which corresponds to the first page of document G, to image processing unit 14. In step ST59, image processing unit 14 stores image processing parameter 15b in register 14a. Then, the processing proceeds to step ST60. In step ST60, parameter control unit 16 notifies CPU 10 of the completion of setting image processing parameter 15b. Then, the processing proceeds to step ST61.

In step ST61, CPU 10 instructs reader unit 13 to start reading the first page of document G. Then, the processing proceeds to step ST62. In step ST62, CPU 10 stores read parameter 15a for a second page of document G in memory 15. In step ST63, CPU 10 stores image processing parameter 15b for the second page of document G in memory 15.

In step ST64, reader unit 13 reads a predetermined number of lines (such as 100 lines) concurrently with the processing in steps ST62 and ST63 by CPU 10. Then, the processing proceeds to step ST65. In step ST65, reader unit 13 notifies CPU 10 of the completion of reading the predetermined number of lines. Then, the processing proceeds to step ST66. In step ST66, CPU 10 instructs image processing unit 14 to start the image processing. Then, the processing proceeds to step ST67. In step ST67, image processing unit 14 starts the image processing of the first page.

After the processing of reading the first page by reader unit 13 is completed in step ST64, the processing proceeds to steps ST68 and ST69. In steps ST68 and ST69, reader unit 13 notifies parameter control unit 16 and CPU 10 of the completion of reading the first page. Then, the processing proceeds to steps ST70 and ST71 illustrated in FIG. 8B.

In steps ST70 and ST71 in FIG. 8B, parameter control unit 16 sets read parameter 15a for the second page to register 13a of reader unit 13 corresponding to the second page of document G. Then, the processing proceeds to step ST72. In step ST72, parameter control unit 16 notifies CPU 10 of the completion of setting read parameter 15a. Then, the processing proceeds to step ST73.

In step ST73, CPU 10 instructs reader unit 13 to read the second page of document G. Then, the processing proceeds to step ST74. In step ST74, upon receipt of the instruction from CPU 10 to read the second page of document G, reader unit 13 performs the processing of reading an image from the second page of document G. In step ST74, while reader unit 13 is reading the image from the second page of document G, image processing unit 14 completes the image processing corresponding to the first page of document G. Then, the processing proceeds to steps ST75 and ST76. In step ST75, image processing unit 14 notifies parameter control unit 16 of the completion of the image processing of the first page of document G. In step ST76, image processing unit 14 notifies CPU 10 of the completion of the image processing of the first page of document G. Then, the processing proceeds to steps ST77 and ST78.

While reader unit 13 is reading the image from the second page of document G (step ST74), in step ST77, parameter control unit 16 sets image processing parameter 15b corresponding to the second page of document G to register 14a of image processing unit 14. In step ST78, image processing unit 14 stores image processing parameter 15b, which corresponds to the second page of document G, in register 14a. Then, the processing proceeds to step ST79. In step ST79, parameter control unit 16 notifies CPU 10 of the completion of setting image processing parameter 15b corresponding to the second page of document G. Then, the processing proceeds to step ST80.

In step ST80, reader unit 13 notifies CPU 10 of the completion of reading the predetermined number of lines. Then, the processing proceeds to step ST81. In step ST81, CPU 10 instructs image processing unit 14 to start the image processing. Then, the processing proceeds to step ST82. In step ST82, image processing unit 14 starts the image processing of the second page. Then, the processing proceeds to steps ST83 and ST84.

In step ST83, reader unit 13 notifies parameter control unit 16 of the completion of reading the second page of document G. In step ST84, reader unit 13 notifies CPU 10 of the completion of reading the second page of document G.

Upon completion of the image processing of the second page of document G by image processing 14 in step ST82, the processing proceeds to steps ST85 and ST86.

In step ST85, image processing unit 14 notifies parameter control unit 16 of the completion of the image processing corresponding to the second page of document G. In step ST86, image processing unit 14 notifies CPU 10 of the completion of the image processing corresponding to the second page of document G. Hence, the processing is terminated.

Effects of First Embodiment

Image reader device 2 and image formation apparatus 1 of the first embodiment perform such control that image processing parameter 15b for the second page of document G is stored in memory 15 during the image processing of the first page of document G, and is set to setting registers 13a and 14a of reader unit 13 and image processing unit 14 without involving CPU 10. Thereby, loads on CPU 10 are reduced during the processing of the first page of document G and the second page of document G. Thus, it is possible to shorten the time needed to switch between read parameters 15a and image processing parameters 15b during the processing of the first page of document G and the second page of document G while avoiding an increase in the circuit scale of each of reader unit 13 and image processing unit 14, while minimizing changes in reader unit 13, image processing unit 14, and firmware which perform the respective image processing tasks.

Second Embodiment

Configuration of Second Embodiment

FIG. 9 is a block diagram illustrating a schematic configuration of a main part of image reader device 2A according to a second embodiment of the invention. Here, constituents which are the same as those in FIG. 1 that illustrates the first embodiment are denoted by the same reference numerals.

Image reader device 2A of the second embodiment includes CPU 10, reader unit 13, and image processing unit 14, which are the same as those in the first embodiment. Image reader device 2A further includes memory 15A and parameter control unit 16A, which have different configurations and functions from those in the first embodiment.

Memory 15A is configured to temporarily store read parameters 15ak for multiple pages (namely, read parameter 15a1 for a first page, read parameter 15a2 for a second page, and so on) used for control of reader unit 13, and image processing parameters 15bk for the multiple pages (namely, image processing parameter 15b1 for the first page, image processing parameter 15b2 for the second page, and so on) used for control of image processing unit 14.

Read parameter control unit 16Aa in parameter control unit 16A is configured to perform the control required to read certain read parameter 15ak stored in memory 15A and to output the certain read parameter 15ak to reader unit 13 on the basis of an operating state of reader unit 13 and storage information on the read parameters 15ak (k=1, 2, and so on) for the subsequent pages notified by CPU 10. This storage information is information indicating which page read parameter 15ak is stored for, which address in memory 15A stores read parameter 15ak for which page, and so forth. A function of reader unit 13 is to read document G on the basis of read parameter 15ak thus set, and to output first image data S13.

Image processing parameter control unit 16Ab in parameter control unit 16A has the function to perform the control required to read certain image processing parameter 15bk stored in memory 15A and to output certain image processing parameter 15bk to image processing unit 14 on the basis of an operating state of image processing unit 14 and storage information on the image processing parameters 15bk (k=1, 2, and so on) for the subsequent page notified by CPU 10. This storage information is information indicating which page image processing parameter, 15bk is stored for, which address in memory 15A stores image processing parameter 15bk for which page, and so forth. Image processing unit 14 is configured to perform image processing of first image data S13 on the basis of the image processing parameter 15bk thus set, and to output second image data S14.

In the meantime, reader unit 13 and image processing unit 14 have the functions to notify CPU 10 and parameter control unit 16A of operating states of the respective units as in the case in the first embodiment. The rest of the configurations are the same as those of the first embodiment.

Operations of Second Embodiment

Figure 10:
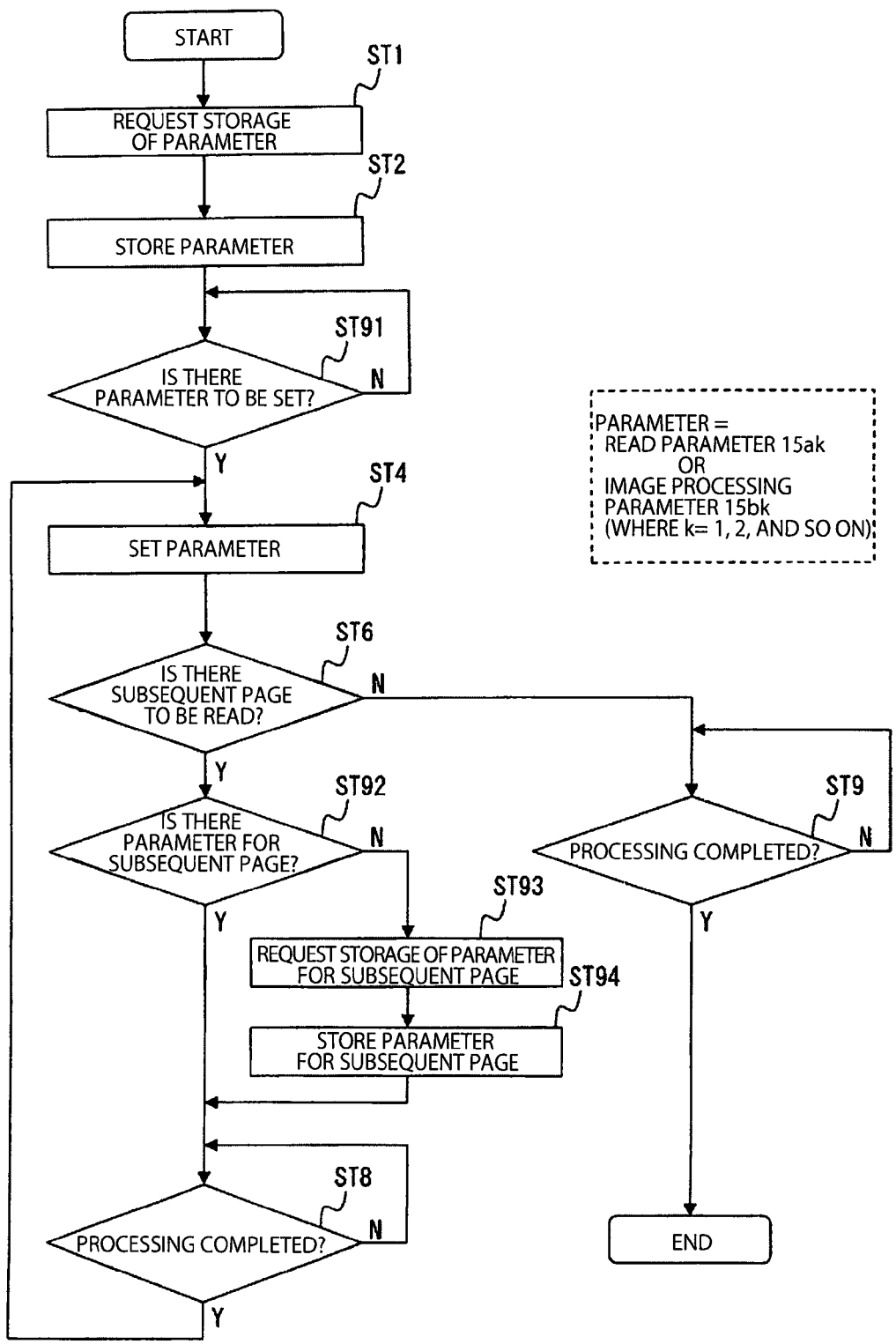
FIG. 10 is a flowchart illustrating a parameter setting processing performed by parameter control unit 16A in FIG. 9.

FIG. 10 is a flowchart illustrating parameter setting processing by parameter control unit 16A in FIG. 9. Here, constituents which are the same as those in FIG. 5 that illustrate the first embodiment are denoted by the same reference numerals.

The term "parameter" on the flowchart in FIG. 10 represents any of read parameters 15ak (k=1, 2, and so on) or image processing parameters 15bk (k=1, 2, and so on). For explanatory convenience, FIG. 10 illustrates only operations relevant to the second embodiment.

First, processing for setting read parameter 15ak by parameter control unit 16A is described in accordance with FIG. 10 and with reference to FIG. 9.

When the user issues a command to start reading document G by manipulation of operation panel 12, processing by parameter control unit 16A is started and the processing proceeds to step ST1. In step ST1, read parameter control unit 16Aa in parameter control unit 16A requests CPU 10 to store read parameters 15ak (k=1, 2, and so on) for one or more pages of document G, including a first page, in memory 15A. Then, the processing proceeds to step ST2. In step ST2, CPU 10 stores read parameters 15ak for the one or more pages, including the first page, in memory 15A. CPU 10 further notifies read parameter control unit 16Aa of the storage information on read parameters 15ak, i.e., the information indicating which pages read parameters 15ak are stored for, which addresses in memory 15A store read parameters 15ak for which pages, and so forth. Then, the processing proceeds to step ST91.

In step ST91, read parameter control unit 16Aa monitors whether or not read parameter 15a1 for the first page is stored in register 13a of reader unit 13, and the processing proceeds to step ST4 when its storage is confirmed (Y). In step ST4, read parameter control unit 16Aa sets read parameter 15a1 for the first page stored in memory 15A to reader unit 13 on the basis of read parameter information from CPU 10, namely, information indicating which address in memory 15A stores read parameter 15a1 for the first page. After the setting is completed, read parameter control unit 16Aa notifies CPU 10 of the completion of setting the parameter. Then, the processing proceeds to step ST6.

In step ST6, a judgment is made as to whether or not there is a subsequent page of document G to be read. When there is a subsequent page of document G to be read (Y), the processing proceeds to step ST92. In step ST92, a judgment is made as to whether or not read parameter 15a2 for the subsequent page is set. The processing proceeds to step ST93 when read parameter 15a2 is not set (N). The processing proceeds to step ST8 when read parameter 15a2 is set (Y). In step ST93, read parameter control unit 16Aa requests CPU 10 to store read parameters 15ak for one or more pages, including the subsequent page, in memory 15A. Then, the processing proceeds to step ST94. In step ST94, CPU 10 stores read parameters 15ak for the one or more pages, including the subsequent page, in memory 15A. CPU 10 further notifies read parameter control unit 16Aa of the storage information on read parameters 15ak, i.e., the information indicating which pages read parameters 15ak are stored for, which addresses in memory 15A store read parameters 15ak for which pages, and so forth. Then, the processing proceeds to step ST8.

In step ST8, read parameter control unit 16Aa waits for the completion of outputting first image data S13 from reader unit 13 (N). After the completion of outputting first image data S13 (Y), the process returns to step ST4. Thereafter, the processing of steps ST4, ST6, ST92 to ST94, and ST8 is repeated until there are no more pages of document G to be read subsequently (N) in step ST6. When the judgment is made in step ST6 that there are no more pages of document G to be read subsequently (N), the processing proceeds to step ST9 where CPU 10 waits for the completion of outputting first image data S13 from reader unit 13 (N). Upon the completion of outputting first image data S13 (Y), CPU 10 terminates the processing by read parameter control unit 16Aa.

Next, processing for setting image processing parameter 15bk by parameter control unit 16A of the second embodiment is described.

When the user issues a command to start reading document G by manipulation of operation panel 12, processing by parameter control unit 16A is started and the processing proceeds to step ST1. In step ST1, image processing parameter control unit 16Ab in parameter control unit 16A requests CPU 10 to store image processing parameters 15bk (k=1, 2, and so on) for one or more pages of document G, including a first page, in memory 15A. Then, the processing proceeds to step ST2. In step ST2, CPU 10 stores image processing parameters 15bk for the one or more pages, including the first page, in memory 15A. CPU 10 further notifies image processing parameter control unit 16Ab of the storage information on image processing parameters 15bk, i.e., the information indicating which pages image processing parameters 15bk are stored for, which addresses in memory 15A store image processing parameters 15bk for which pages, and so forth. Then, the processing proceeds to step ST91.

In step ST91, image processing parameter control unit 16Ab monitors whether or not image processing parameter 15b1 for the first page is stored in register 14a of image processing unit 14, and the processing proceeds to step ST4 when its storage is confirmed (Y). In step ST4, image processing parameter control unit 16Ab sets image processing parameter 15b1 for the first page stored in memory 15A to image processing unit 14 on the basis of image processing parameter information from CPU 10, namely, information indicating which address in memory 15A stores image processing parameter 15b1 for the first page. After the setting is completed, image processing parameter control unit 16Ab notifies CPU 10 of the completion of setting the parameter. Then, the processing proceeds to step ST6.

In step ST6, a judgment is made as to whether or not there is a subsequent page of document G to be read. When there is a subsequent page of document G to be read (Y), the processing proceeds to step ST92.

In step ST92, a judgment is made as to whether or not image processing parameter 15b2 for the subsequent page is set. The processing proceeds to step ST93 when image processing parameter 15b2 is not set (N). The processing proceeds to step ST8 when image processing parameter 15b2 is set (Y). In step ST93, image processing parameter control unit 16Ab requests CPU 10 to store image processing parameters 15bk for one or more pages, including the subsequent page, in memory 15A. Then, the processing proceeds to step ST94. In step ST94, CPU 10 stores image processing parameters 15bk for the one or more pages, including the subsequent page, in memory 15A. CPU 10 further notifies image processing parameter control unit 16Ab of the storage information on image processing parameters 15bk, i.e., the information indicating which pages image processing parameters 15bk are stored for, which addresses in memory 15A store image processing parameters 15*bk* for which pages, and so forth. Then, the processing proceeds to step ST8.

In step ST8, image processing parameter control unit 16Ab waits for the completion of outputting second image data S14 from image processing unit 14 (N). Upon completion of outputting second image data S14 (Y), the process returns to step ST4. Thereafter, the processing of steps ST4, ST6, ST92 to ST94, and ST8 is repeated until there are no more pages of document G to be read subsequently (N) in step ST6. When the judgment is made in step ST6 that there are no more pages of document G to be read subsequently (N), the processing proceeds to step ST9 where CPU 10 waits for the completion of outputting second image data S14 from image processing unit 14 (N). Upon completion of outputting second image data S14 (Y), CPU 10 terminates the processing by image processing parameter control unit 16Ab.

As for the second embodiment, the image read processing in the case where there are two pages of document G to be read is illustrated in FIGS. 8A and 8B. When document G has three or more pages, while reader unit 13 is reading the image from the second page of document G in step ST74, CPU 10 performs the processing of storing read parameter 15*a* for the third page and image processing parameter 15*b* corresponding to the third page of document G in memory 15.

The flow of the processing by reader unit 13 in the second embodiment is similar to that shown in FIG. 6 provided for the first embodiment and its description is therefore omitted. In addition, the flow of the processing by image processing unit 14 in the second embodiment is similar to that shown in FIG. 7 provided for the first embodiment and its description is therefore omitted.

Effects of Second Embodiment

The second embodiment is configured to perform such control that read parameters 15*ak* (k=1, 2, and so on) and image processing parameters 15*bk* (k=1, 2, and so on) for the multiple pages of document G are stored in 15A, and are set to register 13*a* of reader unit 13 and register 14*a* of image processing unit 14 without involving CPU 10. Thereby, it is possible to enhance the design freedom of firmware by allowing the setting of image processing parameter 15*b*3 for the third page during the image processing of the first page of document G, for instance.

Third Embodiment

Configuration of Third Embodiment

Figure 11:
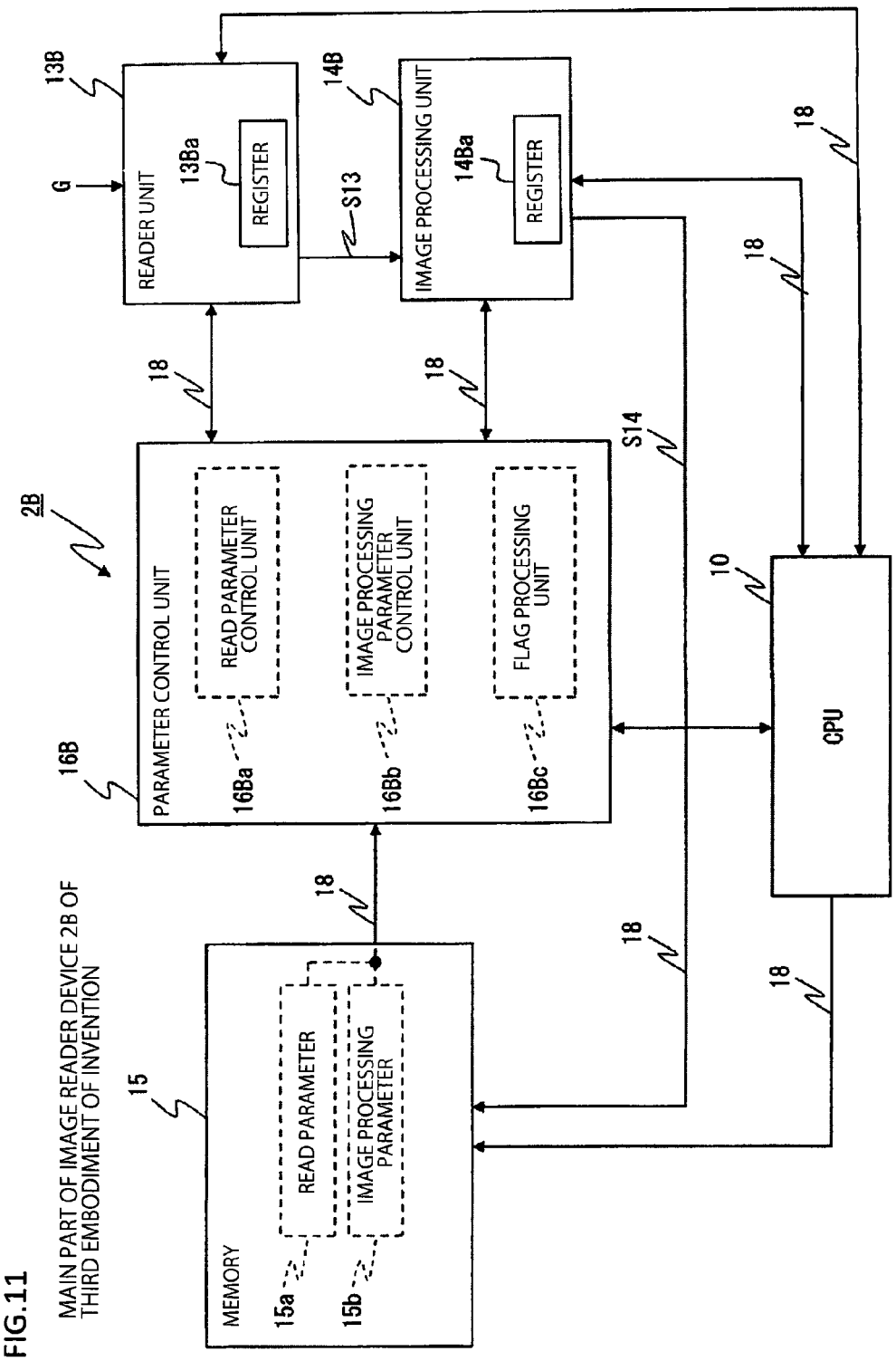
FIG. 11 is a block diagram illustrating a schematic configuration of a main part of image reader device 2B according to a third embodiment of the invention.

FIG. 11 is a block diagram illustrating a schematic configuration of a main part of image reader device 2B according to a third embodiment of the invention. Here, constituents which are the same as those in FIG. 1 that illustrate the first embodiment are denoted by the same reference numerals.

Image reader device 2B of the third embodiment includes CPU 10 and memory 15 which are the same as those in the first embodiment. Image reader device 2B further includes reader unit 13B, image processing unit 14B, and parameter control unit 16B, which have different configurations and functions from those in the first embodiment.

As in the case in the first embodiment, CPU 10 has the function by which read parameter 15*a* used to control read mechanism unit 13 and image processing parameter 15*b* used by image processing unit 14B are temporarily stored in memory 15. Reader unit 13B includes register 13Ba as a first data retainer, and has functions to: read document G on the basis of read parameter 15*a* set to register 13Ba; generate first image data S13, and thereby output first image data S13 to image processing unit 14B; and when reader unit 13B is in the state of completing an operation, output flag information notifying this state to parameter control unit 16B and CPU 10. Image processing unit 14B includes register 14Ba as a second data retainer, and has functions to: perform image processing of inputted first image data S13 on the basis of image processing parameter 15*b* set to register 14Ba and thereby output second image data S14 to memory 15; and when image processing unit 14B is in the state of completing an operation, output flag information notifying this state to parameter control unit 16B and CPU 10.

Parameter control unit 16B includes: read parameter control unit 16Ba and image processing parameter control unit 16Bb which are substantially the same as those in the first embodiment; and flag processing unit 16Bc which is newly added.

Read parameter control unit 16Ba has a function to control the delivery of read parameter 15*a* stored in memory 15 to reader unit 13B. Image processing parameter control unit 16Bb has a function to control the delivery of image processing parameter 15*b* stored in memory 15 to image unit 14B on the basis of an image processing parameter setting command from CPU 10 and flag information from image processing unit 14B notifying its operating state.

Flag processing unit 16Bc has functions to: receive the flag information indicating the state which is outputted from reader unit 13B, and read parameter setting completion notification from CPU 10; notify read parameter control unit 16Ba of a start of control; receive the flag information indicating the state which is outputted from image processing unit 14B, and image processing parameter setting completion notification from CPU 10; and notify image processing parameter control unit 16Bb of a start of control. The rest of the configurations are the same as those of the first embodiment.

Operations of Third Embodiment

Figure 12:
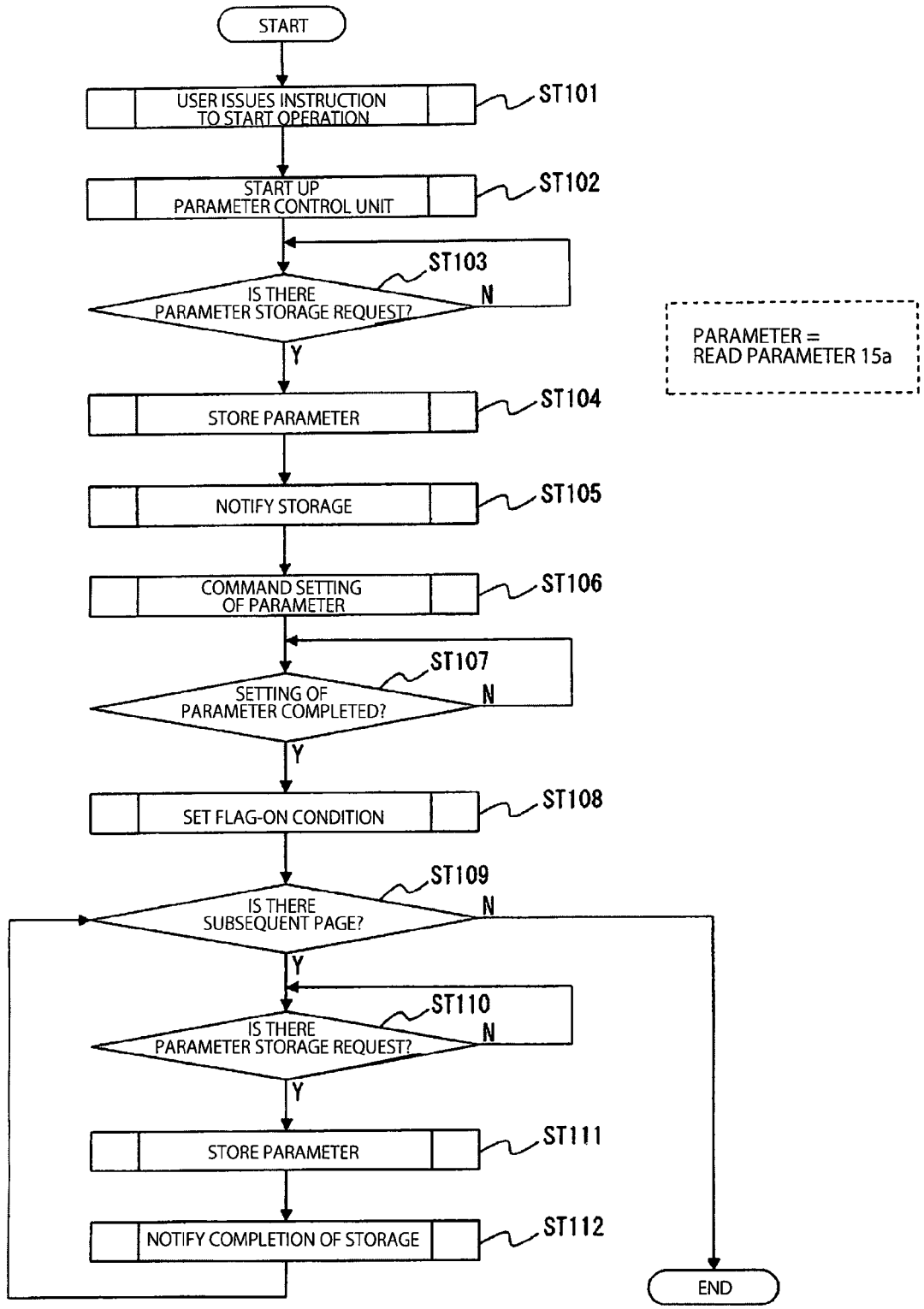
FIG. 12 is a flowchart illustrating a parameter setting processing performed by CPU 10 in FIG. 11.
Figure 13:
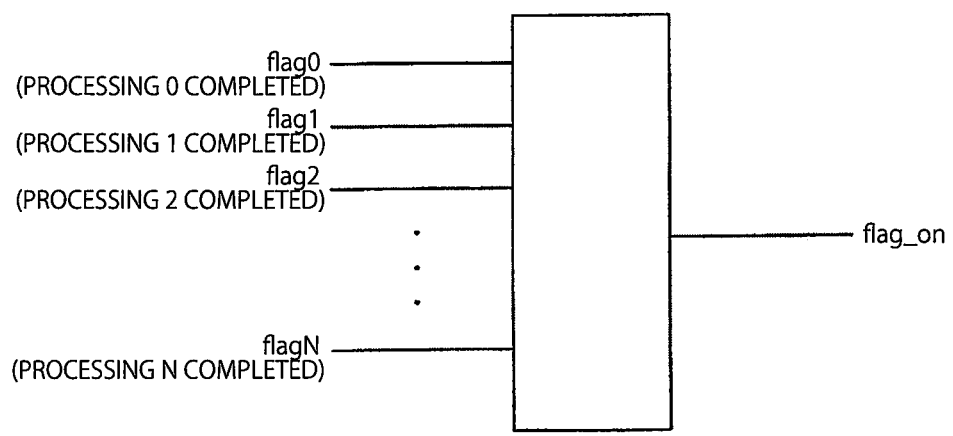
FIG. 13 is a diagram illustrating an example of the setting parameter selection in FIG. 12.

FIG. 12 is a flowchart illustrating the parameter setting processing by CPU 10 in FIG. 11. FIG. 13 is a diagram illustrating an example of setting parameter selection in FIG. 12.

Operations of CPU 10 are described in accordance with FIG. 12. In step ST101, the user issues a command to start reading document G by manipulation of operation panel 12 in FIG. 4. Then, the processing proceeds to step ST102. In step ST102, CPU 10 issues a start-up command to parameter control unit 16B. In the next step ST103, CPU 10 waits for a parameter storage request signal from parameter control unit 16B (N). Upon receipt of the parameter storage request signal (Y) in step ST103, CPU 10 stores read parameter 15*a* for a first page of document G in memory 15 in the next step ST104. Then, the processing proceeds to step ST105. In step ST105, CPU 10 notifies parameter control unit 16B of the completion of storing read parameter 15*a* in memory 15. Then, the processing proceeds to step ST106.

In step ST106, CPU 10 commands read parameter control unit 16Ba to start setting the parameter. In the next step ST107, CPU 10 waits for parameter setting completion notification from read parameter control unit 16Ba (N). When CPU 10 receives the parameter setting completion notification (Y) in step ST107, the processing proceeds to step ST108. In step ST108, CPU 10 sets a parameter setting flag-on condition to flag processing unit 16Bc. Then, the processing proceeds to step ST109.

The parameter setting flag-on condition represents a condition for making a processing parameter for reader unit 13B settable on the basis of pieces of state flag information outputted from reader unit 13B. For example, the processing parameter is made settable (flag on) when flag0 (processing 0 completed) and flag2 (processing 2 completed) are set as illustrated in FIG. 13.

In step ST109, CPU 10 judges whether or not there is a subsequent page to be read. When there is the subsequent page to be read (Y), the processing proceeds to step ST110. CPU 10 terminates the processing when there are no more pages to be read subsequently (N). In step ST110, CPU 10 judges whether or not there is a parameter storage request signal. Upon receipt of the parameter storage request signal (Y), CPU 10 stores read parameter 15a for the subsequent page of document G in memory 15 in the next step ST111. Then, the processing proceeds to step ST112. In step ST112, CPU 10 notifies read parameter control unit 16Ba of the completion of storing read parameter 15a in memory 15. Thereafter, the processing from steps ST109 through ST112 is repeated.

Figure 14:
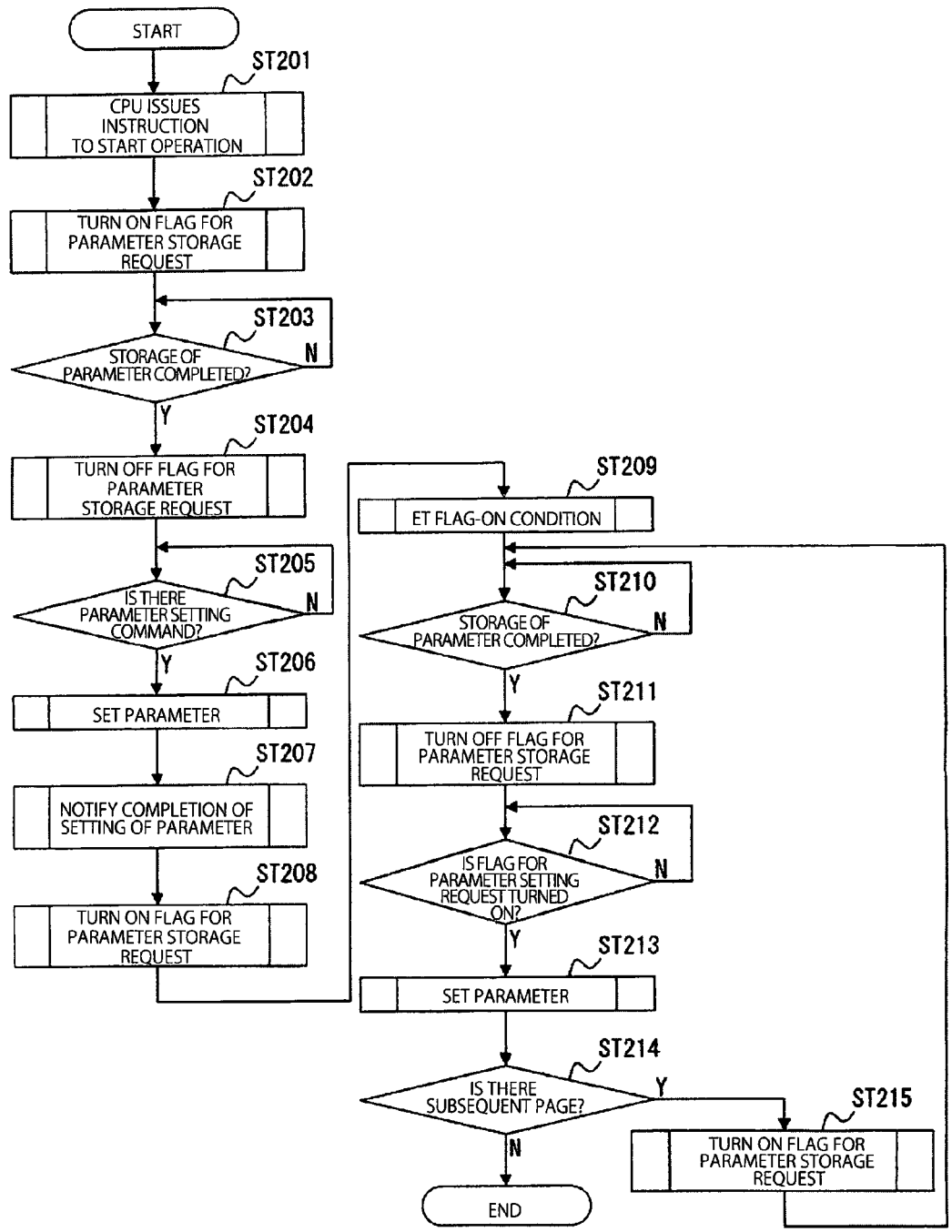
FIG. 14 is a flowchart illustrating a read parameter setting processing in FIG. 11.

FIG. 14 is a flowchart illustrating the read parameter setting processing by read parameter control unit 16Ba and flag processing unit 16Bc in FIG. 11.

The processing by read parameter control unit 16Ba and flag processing unit 16Bc is described in accordance with FIG. 14.

When the processing of FIG. 14 is started and CPU 10 receives an operation start instruction in step ST201 (i.e., step ST102 in FIG. 12), the processing proceeds to step ST202. In step ST202, flag processing unit 16Bc turns on (raises) a parameter storage request flag for the attention of CPU 10. Then, the processing proceeds to step ST203. When read parameter control unit 16Ba receives a parameter storage notification signal from CPU 10 (Y) in step ST203, the processing proceeds to step ST204. In step ST204, flag processing unit 16Bc turns off (drops) the parameter storage request flag for the attention of CPU 10. In the next step ST205, flag processing unit 16Bc waits for a parameter setting command from CPU 10 (N). When flag processing unit 16Bc receives the parameter setting command from CPU (Y) in step S205, the processing proceeds to step ST206.

When flag processing unit 16Bc notifies read parameter control unit 16Ba of the start-up in step ST206, read parameter control unit 16Ba sets read parameter 15a, which is stored in memory 15, to register 13Ba of reader unit 13B. Then, the processing proceeds to step ST207. In step ST207, flag processing unit 16Bc notifies CPU 10 of the completion of setting the parameter. In the next step ST208, flag processing unit 16Bc turns on (raises) the parameter storage request flag. Then, the processing proceeds to step ST209. In step ST209, the parameter setting flag-on condition is set in accordance with step ST108 in FIG. 12. In the next step ST210, read parameter control unit 16Ba waits for the storage of read parameter 15a for the subsequent page in memory 15 by CPU 10 (N). When read parameter 15a is stored (Y) in step ST210, the processing proceeds to step ST211. In step ST211, flag processing unit 16Bc turns off (drops) the parameter storage request flag for the attention of CPU 10. Then, the processing proceeds to step ST212.

In step ST212, flag processing unit 16Bc waits for the state of the flag information outputted from reader unit 13B to match the flag-on condition set by CPU 10 (N). When the state of the flag information matches the set flag-on condition (Y) in step ST212, the processing proceeds to step ST213. When flag processing unit 16Bc notifies read parameter control unit 16Ba of the start-up in step ST213, read parameter control unit 16Ba sets read parameter 15a, which is stored in memory 15, to register 13Ba of read mechanism 13B. Upon completion of the setting, read parameter control unit 16Ba issues a completion notification to flag processing unit 16Bc. Then, the processing proceeds to step ST214.

In step ST214, CPU 10 judges whether or not there is a subsequent page to be read. CPU 10 terminates the processing when there are no more pages to be read subsequently (N). When there is a subsequent page to be read (Y), the processing proceeds to step ST215. In step ST215, flag processing unit 16Bc turns on (raises) the parameter storage request flag again for the attention of CPU 10. Thereafter, the processing from steps ST210 through ST215 is repeated.

Note that the processing of setting the image processing parameter by image processing parameter 16Bb and flag processing unit 16Bc in the third embodiment is similar to the processing of FIG. 14 and its description is therefore omitted.

Figure 15:
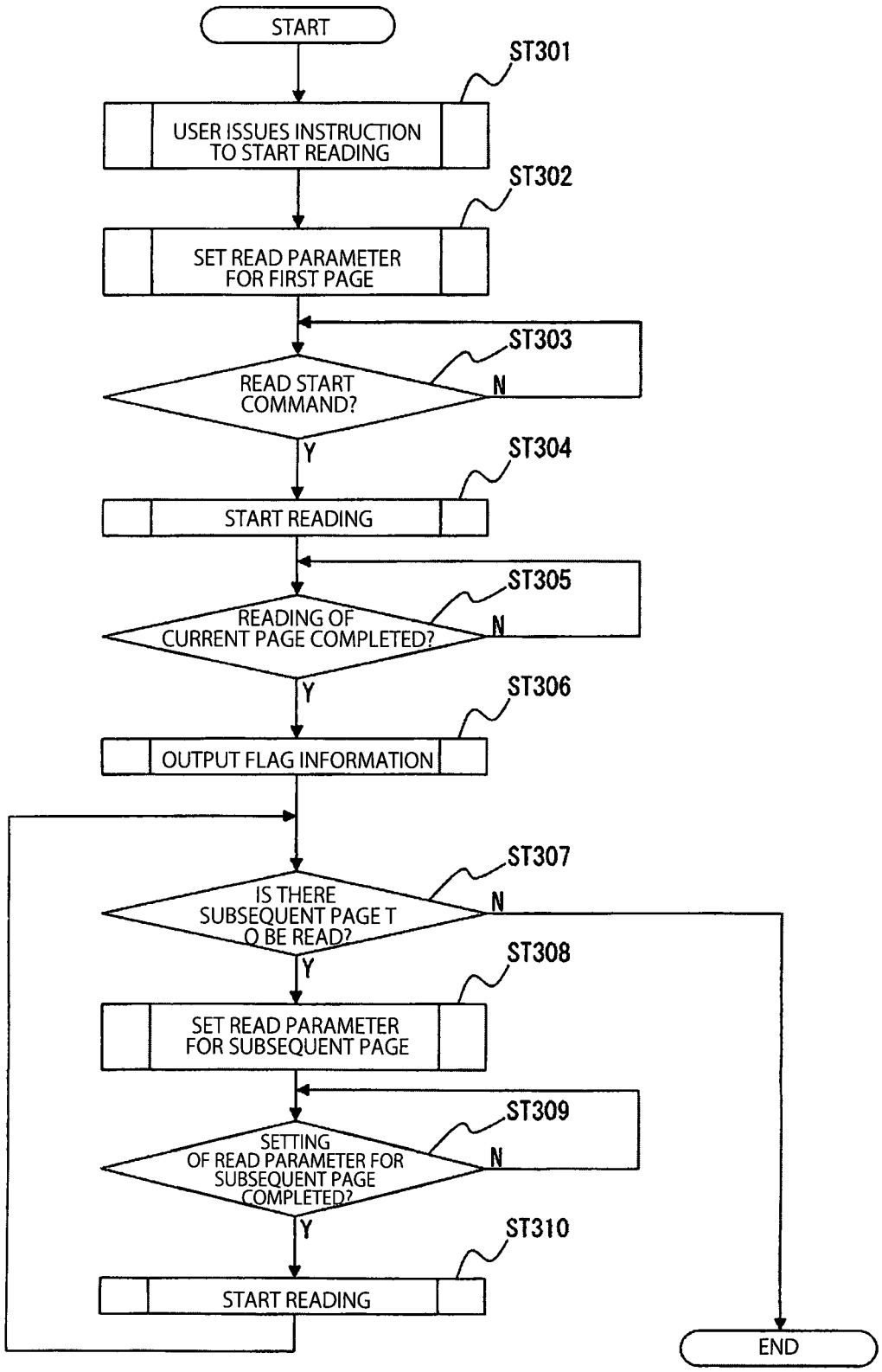
FIG. 15 is a flowchart illustrating a processing performed by reader unit 13B in FIG. 11.

FIG. 15 is a flowchart illustrating the processing by reader unit 13B in FIG. 11. The processing by reader unit 13B is described in accordance with FIG. 15.

When the processing is started and the user issues a command to start reading document G by manipulation of operation panel 12 in FIG. 4 in step ST301, the processing proceeds to step ST302. In step ST302, read parameter 15a for a first page of document G is set to register 13Ba of reader unit 13B in accordance with the read parameter setting processing of FIG. 14. Then, the processing proceeds to step ST303. In step ST303, CPU 10 commands reader unit 13B to start reading (Y). Then, the processing proceeds to step ST304. In step ST304, reader unit 13B starts reading the first page of document G. Then, the processing proceeds to step ST305. In step ST305, reader unit 13B completes reading document G (Y). In the next step ST306, reader unit 13B outputs the states of things, such as the completion of the reading operation, as the flag information to CPU 10 and flag processing unit 16Bc. Then, the processing proceeds to step ST307.

In step ST307, CPU 10 judges whether or not there is a subsequent page to be read. CPU 10 terminates the processing when there are no more pages to be read subsequently (N). When there is a subsequent page to be read (Y), the processing proceeds to step ST308. In step ST308, read parameter 15a for the subsequent page is set to register 13Ba of reader unit 13B in accordance with the processing in step ST213 in FIG. 14. Then, the processing proceeds to step S309. When the setting of read parameter 15a for the subsequent page is completed (Y) in step ST309, the process proceeds to step ST310. When CPU 10 commands reader unit 13B to start reading in step ST310, reader unit 13B starts reading the subsequent page. Thereafter, the processing from steps ST307 through ST310 is repeated.

Note that processing by image processing unit 14B in the third embodiment is similar to the processing by read mechanism 13B of FIG. 15 and its description is therefore omitted.

Effects of Third Embodiment

According to the third embodiment, flag processing unit 16Bc in parameter control unit 16B receives pieces of the flag information from reader unit 13B and image processing unit 14B. Then, read parameter 15a and image processing parameter 15b are automatically set to reader unit 13B and image processing unit 14B, respectively, on the basis of a detected pattern of the flag information. As a consequence, it is possible to set each of read parameter 15a and image processing parameter 15b at an appropriate timing, and thereby to reduce the time required for switching the pages of document G.

Fourth Embodiment

Configuration of Fourth Embodiment

Figure 16:
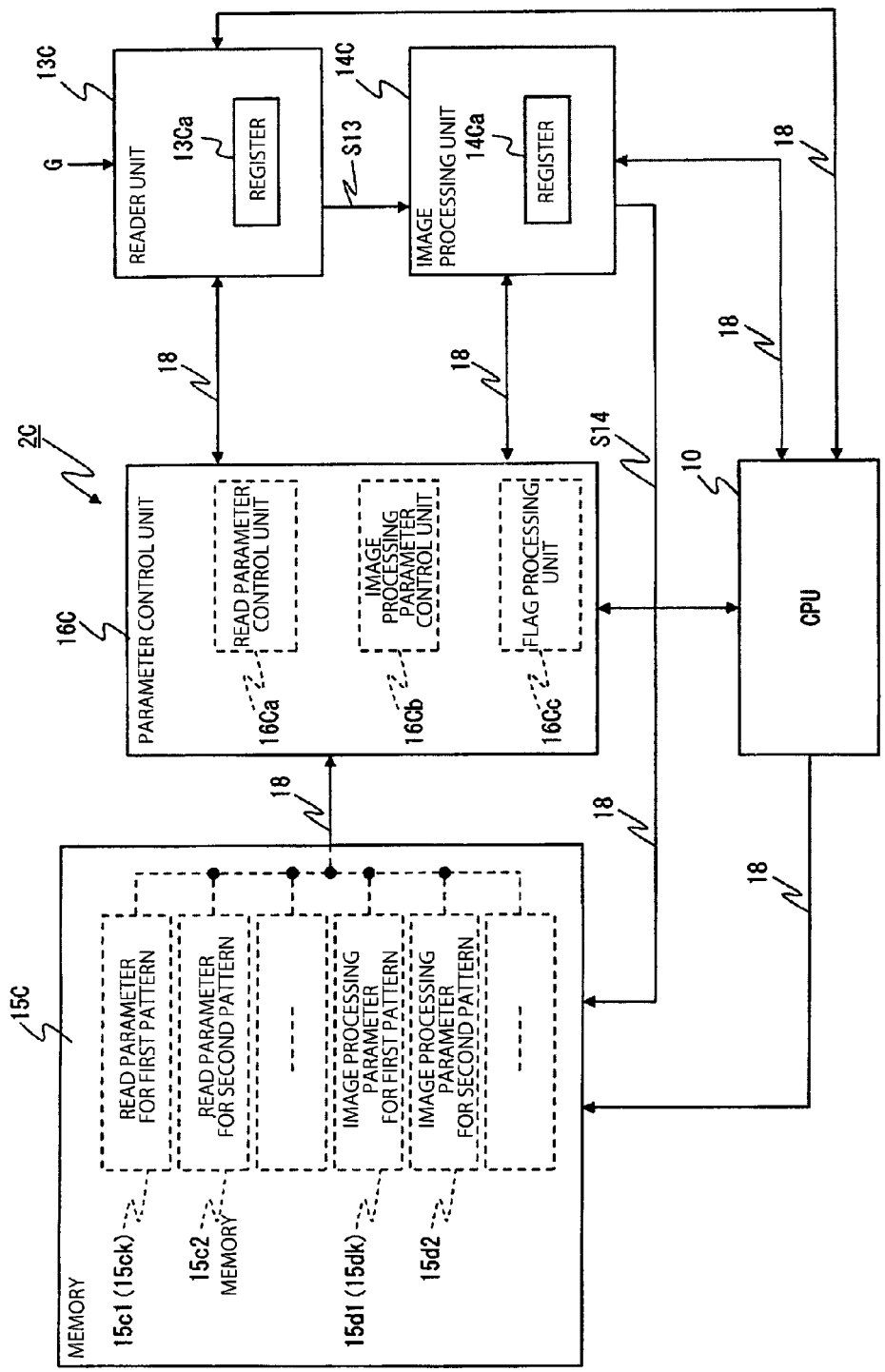
FIG. 16 is a block diagram illustrating a schematic configuration of a main part of image reader device 2C according to a fourth embodiment of the invention.

FIG. 16 is a block diagram illustrating a schematic configuration of a main part of image reader device 2C according to a fourth embodiment of the invention. Here, constituents which are the same as those in FIG. 11 that illustrate the third embodiment are denoted by the same reference numerals.

Image reader device 2C of the fourth embodiment includes CPU 10 which is similar to the one in the third embodiment. Image reader device 2C further includes reader unit 13C, image processing unit 14C, memory 15C, and parameter control unit 16C, which have different configurations and functions from those in the third embodiment.

CPU 10 has a function to temporarily store, in memory 15C, read parameters 15ck for multiple patterns (namely, read parameter 15c1 for a first pattern, read parameter 15c2 for a second pattern, and so on) used for control of reader unit 13C, and image processing parameters 15dk for the multiple patterns (namely, image processing parameter 15d1 for the first pattern, image processing parameter 15d2 for the second pattern, and so on) used by image processing unit 14C.

Reader unit 13C includes register 13Ca as a first data retainer, and has functions to: read document G on the basis of read parameter 15ck (k=1, 2, and so on) set to register 13Ca; generate first image data S13, and thereby output first image data S13 to image processing unit 14C; and when reader unit 13C is in the state of completing an operation, output flag information notifying this state to parameter control unit 16C and CPU 10. Image processing unit 14C includes register 14Ca as a second data retainer, and has functions to: perform image processing of inputted first image data S13 on the basis of image processing parameter 15dk (k=1, 2, and so on) set to register 14Ca, and output second image data S14 to memory 15C; and when image processing unit 14C is in the state of completing an operation, output flag information notifying this state to parameter control unit 16C and CPU 10.

As in the case in the third embodiment, parameter control unit 16C includes read parameter control unit 16Ca, image processing parameter control unit 16Cb, and flag processing unit 16Cc.

Read parameter control unit 16Ca has a function to control the delivery of read parameters 15ck stored in memory 15C to reader unit 13C. This delivery is made on the basis of an operating state of reader unit 13C and the storage information on read parameters 15ck (which address in memory 15C stores which read parameter 15ck, and the like) for the respective flag information patterns outputted from CPU 10. Image processing parameter control unit 16Cb has a function to control the delivery of image processing parameters 15dk stored in memory 15C to image processing unit 14C. This delivery is made on the basis of storage information on image processing parameters 15dk (which address in memory 15C stores which image processing parameter 15dk, and the like) for the respective flag information patterns outputted from CPU 10, and of an operating state of image processing unit 14C.

Flag processing unit 16Cc has functions to: receive the flag information indicating the state, which is outputted from reader unit 13C, as well as read the parameter setting completion notification from CPU 10; notify read parameter control unit 16Ca of a start of control; receive the flag information indicating the state, which is outputted from image process-ing unit 14C, as well as the image processing parameter setting completion notification from CPU 10; and notify image processing parameter control unit 16Cb of a start of control. The rest of the configurations are the same as those of the third embodiment.

Operations of Fourth Embodiment

Figure 17:
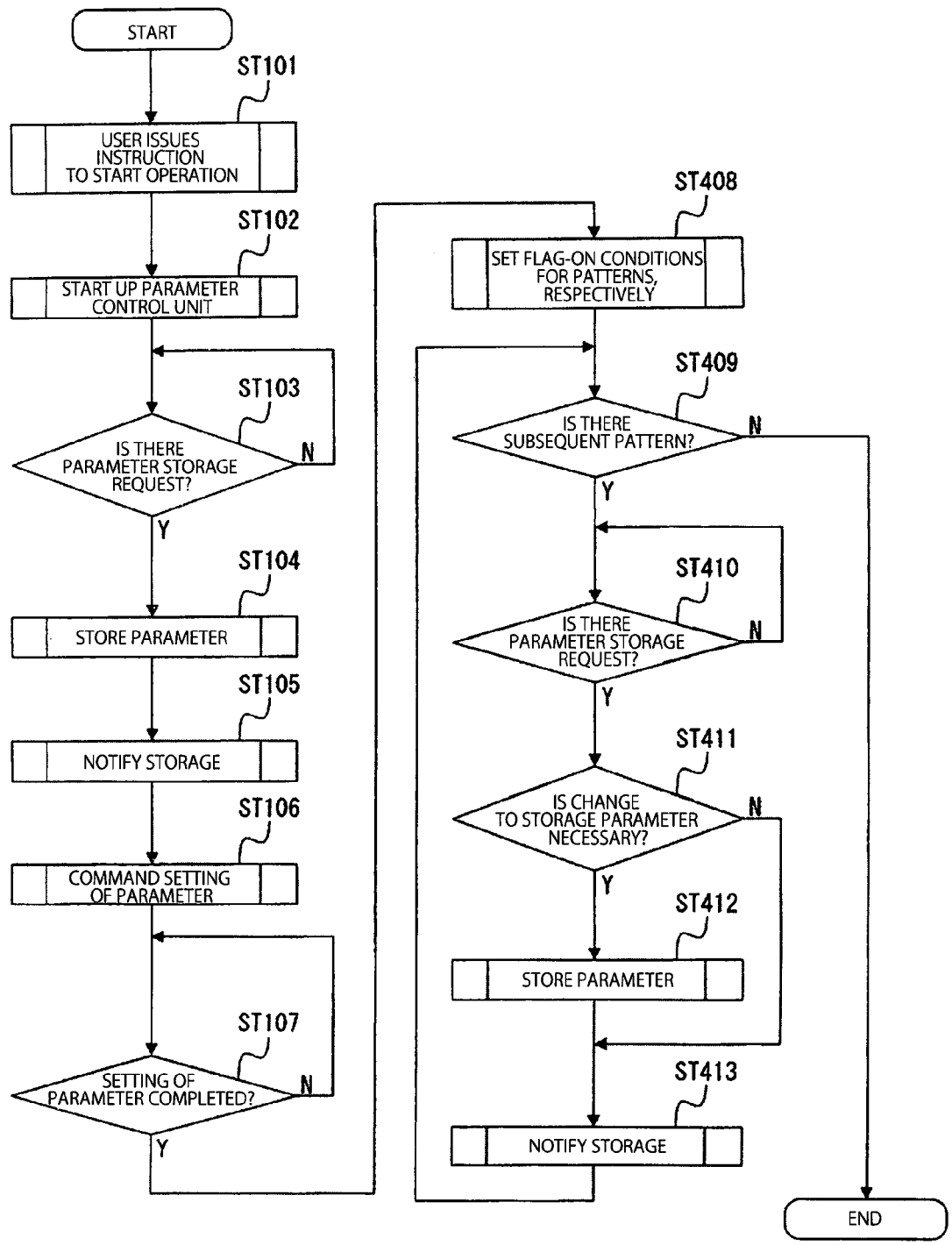
FIG. 17 is a flowchart illustrating a parameter setting processing performed by CPU 10 in FIG. 16.

FIG. 17 is a flowchart illustrating parameter setting processing by CPU 10 in FIG. 16. Here, constituents which are the same as those in FIG. 12 that illustrate the third embodiment are denoted by the same reference numerals. FIG. 18 is a table illustrating examples of the processing parameter setting patterns in FIG. 17.

Operations of CPU 10 are described in accordance with FIG. 17. When CPU 10 starts processing, the processing in steps ST101 through ST107, which is as the same as that in FIG. 12, is performed. Then, the processing proceeds to step ST408.

In step ST408, upon receipt of the parameter setting completion notification from read parameter control unit 16Ca, CPU 10 sets parameter setting flag-on conditions for the respective patterns to flag processing unit 16Cc. Then, the processing proceeds to step ST409. Each of the parameter setting flag-on conditions for the patterns represents a condition for making the processing parameter settable in reader unit 13C on the basis of pieces of state flag information outputted from reader unit 13C. As illustrated in FIG. 18, the parameter setting flag-on conditions are set such that: pattern A among the selection patterns is settable when flag 0 is on, flag1 is on, flag2 is off, and flag3 is off; and pattern B among the selection patterns is settable when flag0 is on, flag1 is on, flag2 is on, and flag3 is off.

In step ST409, CPU 10 judges whether or not there is a subsequent pattern to be read. CPU 10 terminates the processing when there are no more patterns to be read subsequently (N). When there is a subsequent pattern to be read (Y), the processing proceeds to step ST410. In step ST410, CPU 10 judges whether or not there is a parameter storage request signal. Upon receipt of the parameter storage request signal (Y), the processing proceeds to step ST411. In step ST411, CPU 10 judges whether or not it is necessary to change a storage parameter (i.e., read parameter 15cK or image processing parameter 15dk). The processing proceeds to step ST412 in a case (Y) where CPU 10 judges that CPU 10 has never set storage parameters in memory 15C yet as in the first operation after the start-up or the like, or that it is necessary to change the storage parameter in memory 15C. The processing proceeds to step ST413 when CPU 10 judges that it is not necessary to change the storage parameter (N).

In step ST412, CPU 10 stores read parameters 15ck of document G, i.e., the read parameters of the respective patterns. Then, the processing proceeds to step ST413. In step ST413, CPU 10 notifies read parameter control unit 16Ca of the storage information on read parameters 15ck (as to which address in memory 15C stores read parameter 15ck for which pattern, for example). Thereafter, the processing from the steps ST409 through ST413 is repeated.

Figure 19:
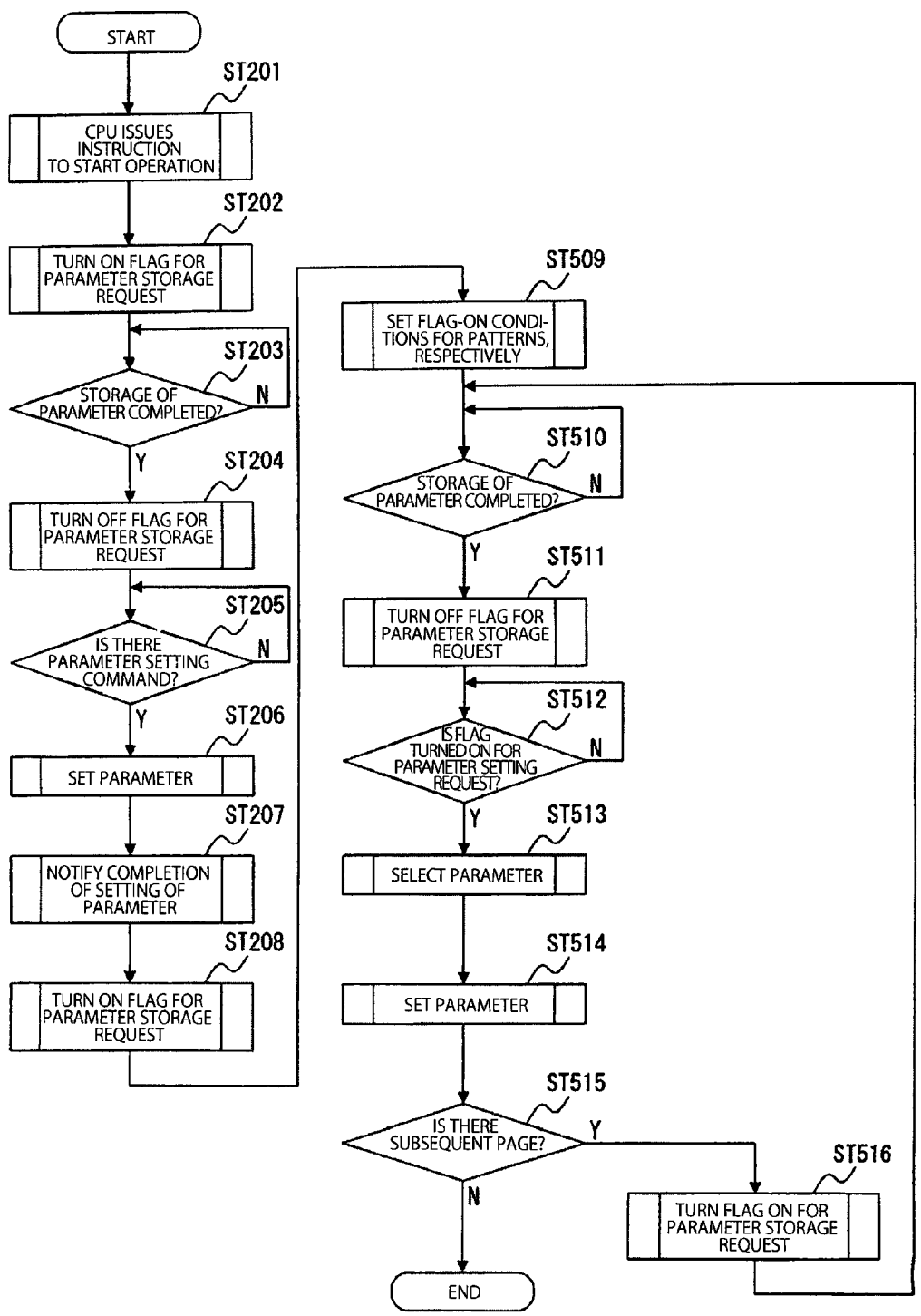
FIG. 19 is a flowchart illustrating the read parameter setting processing in FIG. 16.

FIG. 19 is a flowchart illustrating the read parameter setting processing by read parameter control unit 16Ca and flag processing unit 16Cc in FIG. 16. Here, constituents which are the same as those in FIG. 14 that illustrate the third embodiment are denoted by the same reference numerals.

The processing by read parameter control unit 16Ca and flag processing unit 16Cc is described in accordance with FIG. 19.

When the processing is started, the processing in steps ST201 through ST208, which is as the same as that in FIG. 14, is performed. In step ST208, when parameter control 16C turns on (raises) the parameter storage request flag for the attention of CPU 10, the processing proceeds to the next step ST509.

In step ST509, CPU 10 sets the parameter setting flag-on conditions for the respective patterns as in the case of step ST408 in FIG. 17. Then, the processing proceeds to step ST510. In step ST510, read parameter control unit 16Ca waits for the storage of read parameter 15ck for the subsequent pattern (N). When read parameter 15ck is stored (Y), the processing proceeds to step ST511. In step ST511, flag processing unit 16Cc turns off (drops) the parameter storage request flag for the attention of CPU 10. Then, the processing proceeds to step ST512. In step ST512, flag processing unit 16Cc waits for the state of the flag information outputted from reader unit 13C to match any of the flag-on conditions set by CPU 10 (N). When the state of the flag information matches any of the set flag-on conditions (Y) in step ST512, the processing proceeds to step ST513.

In step ST513, flag processing unit 16Cc selects a parameter and notifies read parameter control unit 16Ca of: read parameter 15ck to be set on the basis of the matching flag condition; and the start of the setting. Then, the processing proceeds to step ST514. In step ST514, read parameter control unit 16Ca sets read parameter 15ck stored in memory 15C to register 13Ca of reader unit 13C. Upon completion of the setting, read parameter control unit 16Ca issues a completion notification to flag processing unit 16Cc. Then, the processing proceeds to step ST515.

In step ST515, CPU 10 judges whether or not there is a subsequent pattern to be read. CPU 10 terminates the processing when there are no more patterns to be read subsequently (N). When there is a subsequent pattern to be read (Y), the processing proceeds to step ST516. In step ST516, flag processing unit 16Cc turns on (raises) the parameter storage request flag again for the attention of CPU 10. Thereafter, the processing from steps ST510 through ST516 is repeated.

Note that the processing of setting image processing parameter 15dk in the fourth embodiment is similar to the above-described processing of setting read parameter 15ck and its description is therefore omitted. Processing by reader unit 13C in the fourth embodiment is similar to the processing in FIG. 15 in the third embodiment and its description is therefore omitted. In addition, processing by image processing unit 14C in the fourth embodiment is similar to the processing by reader unit 13C and its description is therefore omitted.

Effects of Fourth Embodiment

According to the fourth embodiment, flag processing unit 16Cc is provided; and read parameters 15ck of document G for multiple patterns and image processing parameters 15dk of document G are stored in memory 15C. In addition, read parameter 15ck and image processing parameter 15dk to be set are selected on the basis of the detected pattern of the flag information. As a consequence, it is possible to accelerate the timings to set read parameter 15ck and image processing parameter 15dk in memory 15C and to enhance the design freedom of the firmware.

Modified Examples

The invention is not limited only to the above-described first to fourth embodiments, but various other utilization forms and modified examples are possible. For example, the following (1) to (4) represent such utilization forms and modified examples.

(1) While each of the first to fourth embodiments describes an example of applying the invention to a scanner as image reader device 2, 2A, 2B, or 2C, the invention is also applicable to other electronic appliances having an image read function, which include a facsimile, a copier, a multifunction printing apparatus that combines a scanner and a printer, and so forth.

(2) In the first and second embodiments, read parameters 15a or 15ak and image processing parameters 15b or 15bk are set at one time. Instead, it is also possible to perform parameter control for each of multiple pipelines of image processing, and thus to set read parameter 15a or 15ak and image processing parameter 15b or 15bk for each pipeline.

(3) Although a relation between read parameter 15a or 15ak and image processing parameter 15b or 15bk is not mentioned in the first and second embodiments, image processing parameter 15b or 15bk may be set in such a manner as to correspond to read parameter 15a or 15ak. It is possible to improve the quality of second image data S14, which is to be read from document G, subjected to the image processing, and then outputted, by setting image processing parameter 15b or 15bk which corresponds to read parameter 15a or 15ak.

(4) In the third and fourth embodiments, read parameters 15a or 15ck and image processing parameters 15b or 15dk are set at one time. Instead, it is also possible to perform parameter control for each of the multiple pipelines of image processing, and thus to set read parameter 15a or 15ck and image processing parameter 15b or 15dk for each pipeline.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:
1. An image reader device comprising:
an image reading unit configured to read images from pages of a document by an image read processing based on a read parameter for a current page, and to output a first image data;
an image processing unit configured to process the first image data outputted from the image reading unit by image processing based on an image processing parameter for the current page, and to output a second image data;
a storage unit configured to store the second image data outputted from the image processing unit, a read parameter for a subsequent page, and an image processing parameter for the subsequent page; and
a parameter control unit configured to read the read parameter for the subsequent page stored in the storage unit and provide the read parameter for the subsequent page directly to the image reading unit after the image read processing of the current page, and to read the image processing parameter for the subsequent page stored in the storage unit and provide the image processing parameter for the subsequent page directly to the image processing unit after the image processing of the current page,
wherein the image reading unit further comprises a first data retainer into which the read parameter for the subsequent page is written upon completion of the image processing of the current page, and from which the read parameter for the subsequent page is read in the image read processing of the subsequent page of the document, and the image processing unit further comprises a second data retainer into which the image processing parameter for the subsequent page is written upon completion of the image read processing of the current page, and from which the image processing parameter for the subsequent page is read in the image processing of the subsequent page of the document.

2. The image reader device according to claim 1, wherein the storage unit is configured to store the read parameters to be used in the image read processing of pages and the image processing parameters to be used in the image processing of the pages, and the parameter control unit is configured to read the read parameter stored in the storage unit upon completion of the image read processing of the current page and to provide the read parameter directly to the image reading unit, and to read the image processing parameter stored in the storage unit upon completion of the image processing of the current page, and to provide the image processing parameter directly to the image processing unit.

3. The image reader device according to claim 1, wherein the parameter setting processing to provide the read parameter directly to the image reading unit starts depending on an operating state of the image reading unit, and the parameter setting processing to provide the image processing parameter directly to the image processing unit starts depending on an operating state of the image processing unit.

4. The image reader device according to claim 3, wherein each operating state is indicated with flag information, and the image reader device comprises a flag processing unit configured to process the flag information.

5. An image formation apparatus comprising:
the image reader device of claim 1; and
an image formation unit configured to form an image on a record medium based on the second image data, which is read and subjected to the image read processing and the image processing by the image reader device.

6. An image reader device comprising:
an image reading unit configured to read images from pages of a document by an image read processing based on a read parameter for a current page, and to output a first image data;
an image processing unit configured to process the first image data outputted from the image reading unit by image processing based on an image processing parameter for the current page, and to output a second image data;
a storage unit configured to store the second image data outputted from the image processing unit, a read parameter for a subsequent page, and an image processing parameter for the subsequent page; and
a parameter control unit configured to read the read parameter for the subsequent page stored in the storage unit and provide the read parameter for the subsequent page directly to the image reading unit after the image read processing of the current page, and to read the image processing parameter for the subsequent page stored in the storage unit and provide the image processing parameter for the subsequent page directly to the image processing unit after the image processing of the current page, wherein the image read processing and the image processing are executed through two or more series of pipeline processing, and the storage unit stores the read parameters and the image processing parameters used in the series of the pipeline processing.

7. The image reader device according to claim 6, wherein timings for providing the read parameter and the image processing parameter to be used in each series of the pipeline processing to execute the image read processing and the image processing are set to individual time points when the image read processing and the image processing are respectively completed in a previous series of pipeline processing.

8. The image reader device according to claim 6, wherein each series of the pipeline processing executed through the image processing comprises a shading correction processing, a data compression processing, and a gamma correction processing.

9. An image reader device comprising:
an image reading unit configured to read images from pages of a document by an image read processing based on a read parameter for a current pattern, and to output a first image data;
an image processing unit configured to process the first image data outputted from the image reading unit by image processing based on an image processing parameter for the current pattern, and to output a second image data;
a storage unit configured to store the second image data outputted from the image processing unit, a read parameter for a subsequent pattern, and an image processing parameter for the subsequent pattern; and
a parameter control unit configured to read the read parameter for the subsequent pattern stored in the storage unit and provide the read parameter for the subsequent pattern directly to the image reading unit after the image read processing of the current pattern, and to read the image processing parameter for the subsequent pattern stored in the storage unit and provide the image processing parameter for the subsequent pattern directly to the image processing unit after the image processing of the current pattern, wherein
the image reading unit further comprises a first data retainer into which the read parameter for the subsequent pattern is written upon completion of the image processing of the current pattern, and from which the read parameter for the subsequent pattern is read in the image read processing of the subsequent pattern of the document, and the image processing unit further comprises a second data retainer into which the image processing parameter for the subsequent pattern is written upon completion of the image read processing of the current pattern, and from which the image processing parameter for the subsequent pattern is read in the image processing of the subsequent pattern of the document.

10. The image reader device according to claim 9, wherein the parameter setting processing to provide the read parameter directly to the image reading unit wherein the parameter setting processing starts depending on an operating state of the image reading unit, and the parameter setting processing to provide the image processing parameter directly to the image processing unit starts depending on an operating state of the image processing unit.

11. The image reader device according to claim 10, wherein
each operating state is indicated with flag information, and
the image reader device comprises a flag processing unit configured to process the flag information.

12. The image reader device according to claim 9, wherein
the storage unit selects the parameters to be set to the image reading unit depending on the operating state of the image reading unit, and
the storage unit selects the parameters to be set to the image processing unit depending on the operating state of the image processing unit.

* * * * *